United States Patent
Duffy et al.

(10) Patent No.: US 11,514,284 B2
(45) Date of Patent: Nov. 29, 2022

(54) PAPERCRAFT DIGITIZATION

(71) Applicant: SOCIETE BIC, Clichy (FR)

(72) Inventors: David Duffy, Clichy (FR); Bernadette Elliott-Bowman, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/546,975

(22) Filed: Dec. 9, 2021

(65) Prior Publication Data

US 2022/0237424 A1 Jul. 28, 2022

(30) Foreign Application Priority Data

Jan. 26, 2021 (EP) .................................... 21305094

(51) Int. Cl.
| | | |
|---|---|---|
| G06K 19/06 | (2006.01) | |
| G06K 19/02 | (2006.01) | |
| G06F 16/38 | (2019.01) | |
| G06K 7/10 | (2006.01) | |
| G06K 19/067 | (2006.01) | |

(52) U.S. Cl.
CPC ......... G06K 19/025 (2013.01); G06F 16/381 (2019.01); G06K 7/10366 (2013.01); G06K 19/0672 (2013.01)

(58) Field of Classification Search
CPC ............ G06K 19/025; G06K 7/10366; G06K 19/0672
USPC ........................................................ 235/492
See application file for complete search history.

(56) References Cited

U.S. PATENT DOCUMENTS

| | | | | |
|---|---|---|---|---|
| 7,301,460 | B2* | 11/2007 | Coste ............... | G06K 19/07798 340/572.1 |
| 10,833,392 | B1* | 11/2020 | Zekios ............... | H01Q 15/0013 |
| 2011/0308986 | A1* | 12/2011 | Lee ...................... | B65D 5/4208 229/120.08 |
| 2012/0067962 | A1* | 3/2012 | McDonald ............. | G09B 29/04 174/254 |
| 2017/0326466 | A1 | 11/2017 | Chae | |

FOREIGN PATENT DOCUMENTS

CN 107100035 A 8/2017

OTHER PUBLICATIONS

Extended European Search Report dated Jul. 13, 2021 in counterpart European Patent Application No. 21305094.1 (5 pages, in English).

* cited by examiner

*Primary Examiner* — Jamara A Franklin
(74) *Attorney, Agent, or Firm* — Bookoff McAndrews, PLLC

(57) ABSTRACT

A computer-implemented method for digitization of papercraft folding for creation of a papercraft model may include monitoring, via an RFID reader, a sheet provided with an array of RFID tags. Based on the RFID reader output, the occurrence of a fold performed on the sheet is determined. The method further includes determining fold properties of the occurred fold and storing the fold properties as a fold dataset of the occurred fold.

20 Claims, 10 Drawing Sheets

PAPERCRAFT DIGITIZATION

CROSS REFERENCE TO RELATED APPLICATIONS

This application claims priority from European patent application No. 21305094.1, filed on Jan. 26, 2021, the contents of which are hereby incorporated herein in their entirety by this reference.

TECHNICAL FIELD

The present disclosure relates to computer-implemented methods for digitization of papercraft folding for creation of a papercraft model, and to papercraft digitization systems configured to perform such methods.

BACKGROUND

Papercraft is an artform (e.g. the artform of origami) based on the folding, i.e. papercraft folding, of two-dimensional (2D) paper or card, in general terms a sheet, to create three-dimensional (3D) designs, i.e. a papercraft model.

Digitization of papercraft is currently limited, with some artificial intelligence (AI) systems existing which take a digital 3D file as an input to generate a fold list which need to occur in order to create that 3D shape with real paper, but there is a lack of approaches centered on doing the reverse: digitizing analogue creations.

The object of the present disclosure is to provide an alternative method to obtain a fold list of folds which need to be performed on a sheet to create a papercraft model. Another object of the present disclosure is to provide a method of monitoring and supporting a user during the creation of a papercraft model at each folding step.

SUMMARY

The present disclosure relates to a computer-implemented method as defined in claim 1 and a papercraft digitization system as defined in claim 15. The dependent configurations depict embodiments of the present disclosure.

The computer-implemented method for digitization of papercraft folding for creation of a papercraft model comprises:
monitoring, via an RFID reader, a sheet provided with an array of RFID tags,
determining, based on RFID reader output, the occurrence of a fold performed on the sheet,
determining fold properties of the occurred fold, and
storing the fold properties as a fold dataset of the occurred fold.

In some aspects, the monitoring may comprise:
sending an emitter signal from the RFID reader,
receiving a return signal from each RFID tag, and
outputting the received return signals as RFID reader output.

In a first embodiment, the computer-implemented method may further comprise:
generating a fold list by aggregating the respective fold datasets of occurred folds.

In a second embodiment, the computer-implemented method may further comprise:
generating an updating fold list by aggregating the respective fold datasets of occurred folds performed by a user according to folding instructions of a papercraft model selected by the user,
assessing the adherence of the updating fold list to an existing fold list which corresponds to the selected folding instructions, and
generating a user output if fold discrepancies between the updating fold list and the existing fold list are determined.

In a first refinement which is combinable with any one of the preceding aspects and embodiments, determining the occurrence of a fold performed on the sheet may comprise applying a tag proximity algorithm configured to:
obtain the RFID reader output,
analyze the received return signals to evaluate a proximity between RFID tags,
generate a proximity link between two RFID tags when proximity between these two RFID tags is determined, wherein the proximity link includes tag IDs of the two RFID tags proximity was determined for, and
assess the occurrence of a fold by outputting the proximity links.

In one aspect of the first refinement, analyzing the return signals may comprise:
determining return signal properties of each received return signal,
comparing return signal properties of a received return signal of each RFID tag with return signal properties of a received return signal of every other RFID tag, and
determining a proximity between two RFID tags if their return signal properties correlate within a predefined threshold.

In another aspect which is combinable with the preceding aspect, determining return signal properties may comprise determining a relative change of return signal strength of a received return signal. The change of return signal strength of a received return signal may be determined by a comparison with return signal strength of a previously received return signal of the same RFID tag. Comparing return signal properties may comprise comparing a relative change, specifically a decrease, of return signal strength of received return signals. A proximity between two RFID tags may be determined if one or both of the following conditions are met:
the return signals of the two RFID tags exhibit correlating decreases in return signal strength, and
the decreases in return signal strength exceed a predetermined threshold of decrease. The threshold of decrease may be at least substantially 15%, more specifically at least substantially 25%, more specifically at least substantially 50%, and most specifically at least substantially 80%. The proximity link may include a proximity value which represents a fractional percentage decrease of the return signal strengths of the respective RFID tags proximity was determined for.

Alternatively, a binary-type proximity link may be used which assumes the value of 1 if the threshold condition is met.

Alternatively or additionally to the preceding aspect, determining return signal properties may comprise calculating a phase shift between a received return signal and the emitted signal. Comparing return signal properties may comprise comparing phase shifts of the received return signals. A proximity between two RFID tags may be determined if their respective phase shifts are substantially equal. Alternatively or additionally, a proximity between two RFID tags may be determined if their respective phase shifts are substantially equal within a relative tolerance interval of −15% to +15%, more specifically within −10% to +10%, and in examples within −5% to +5% or within −2.5% to +2.5%.

The proximity link may include a proximity value which is calculated from a deviation of phase shifts of the RFID tags proximity was determined for. Alternatively a binary-type proximity link may be used which assumes the value of 1 if the phase shifts correlate within the tolerance interval.

In another aspect which is combinable with any one of the preceding aspects, the generation of a proximity link may be triggered upon determining proximity between two RFID tags.

In another aspect which is combinable with any one of the preceding aspects, outputting a proximity link may comprise storing it on a tag database and relating it to the tag IDs of the RFID tags proximity was determined for.

In another aspect which is combinable with any one of the preceding aspects, the tag proximity algorithm may be further configured to:
  initiate a papercraft digitization algorithm upon recognition of a new proximity link.

In a second refinement which is combinable with any one of the preceding aspects, refinements and embodiments, determining the fold properties of an occurred fold may comprise applying a papercraft digitization algorithm configured to:
  calculate fold properties of each fold based on tag data of the RFID tags.

The tag data may include for each RFID tag one or more of a tag ID, predefined tag coordinates with respect to the sheet, a tag resonance frequency, a proximity link, if present. In examples, the tag data may include all of the previously mentioned information. The tag data may be stored on a tag database.

In one aspect of the second refinement, calculating the fold properties may comprise retrieving tag data from the tag database. Additionally, calculating the fold properties may comprise determining a mid-point of the occurred fold by averaging x-coordinates and y-coordinates of the RFID tags being correlated by a proximity link. Additionally, calculating the fold properties may comprise determining x- and y-coordinates of a fold line through which the occurred fold is estimated to run through based on the mid-point and/or the x-coordinates and y-coordinates of the RFID tags. Additionally, calculating the fold properties may comprise determining a folding angle of the occurred fold with respect to a datum, such as a specific edge of the sheet having a length L, using trigonometry and the x- and y-coordinates of the previously calculated fold line. Additionally, if proximity values are present, calculating the fold properties may comprise determining a closing angle of the occurred fold based on a change rate of proximity values of RFID tags distanced further away from the fold line in a normal direction. The closing angle may be determined by assessing a series of proximity values of RFID tags arranged along a normal direction with respect to the fold line and in an increasing distance from the fold line, and then applying a conversion factor to the series of proximity values to obtain the closing angle.

In a third refinement which is combinable with any one of the preceding aspects, refinements and embodiments, the computer-implemented method may be executed in real-time during the creation process of folding. The emitter signal may be repeatedly sent at specific time intervals. The time interval between two emitter signals may be selected to secure that a maximum of one fold is performed during the time interval. Additionally, the time interval may be determined by a sampling rate. Additionally, the sampling rate may have a frequency of at least 0.1 Hz, specifically at least 1 Hz, more specifically at least 5 Hz and most specifically at least 10 Hz. A set of return signals may repeatedly be received at each time interval. The set of return signals may contain a return signal received from each of the RFID tags. The repeatedly received sets of return signals may form a time series of sets of return signals. Each set of return signals of the time series may be analyzed. Additionally, each set of return signals of the time series may be analyzed by comparing a newly received set of return signals with a set of return signals received at a previous, specifically immediately previous, time interval. Alternatively or additionally, a set of proximity links may be generated at each time interval, if proximity is determined. Additionally, fold properties may be determined for each set of proximity links. Alternatively or additionally, for each set of proximity links the fold properties may be added as a new fold dataset in the fold list.

In another aspect which is combinable with any one of the preceding aspects, refinements and embodiments, the sheet may be repeatedly monitored at regular time intervals. Additionally, a time series of sets of return signals may be received from the RFID tags and analyzed. Additionally, return signals may be compared within the set of return signals received at the same time interval and/or with one or more sets of return signals over previous time intervals. Additionally, based on the comparison, fold properties of occurred folds may be calculated which must have taken place in order to receive the present set of return signals.

In a fourth refinement which is combinable with any one of the preceding aspects, refinements and embodiments, the computer-implemented method may be executed after the creation process of folding is completed. The emitter signal may be sent at least once to receive at least one set of return signals. Additionally, determining the fold properties of an occurred fold may comprise applying a papercraft digitization algorithm configured to reverse-generate a fold list including the fold datasets of folds which must have occurred based on the present set of proximity links determined from the at least one set of return signals. Additionally, the reverse-generating may include:
  virtually unfolding the sheet to reach a state of zero proximity links,
  generating possible lists of unfolds resulting in a completely unfolded sheet,
  ranking the generated lists of unfolds,
  selecting one list of unfolds based on given parameters, such as a number of fewest unfolds, and
  reversing the selected list of unfolds to obtain a fold list.

In a fifth refinement which is combinable with any one of the preceding aspects, refinements and embodiments, the computer-implemented method may further comprise:
  applying the fold list to a virtual representation of the sheet, and
  displaying the virtual representation via a user-interface.

In one aspect of the fifth refinement, applying the fold list to a virtual representation of the sheet may include applying a fold render algorithm configured to:
  create a three-dimensional mesh model of the sheet in an unfolded state,
  apply the fold datasets from the fold list, specifically one at a time, and
  recalculate the mesh model with each application of a fold dataset.

Additionally, the fold render algorithm may be further configured to store the mesh model at different stages of the application of fold datasets as a virtual representation of the sheet representing the sheet in a folded state. Alternatively or additionally, the fold render algorithm may be further configured to store the mesh model after the application of all fold datasets as a virtual representation of the sheet representing the sheet in a completely folded state. Alternatively or additionally, the user-interface may be configured to allow a user to view, move and/or edit the virtual representation. The user-interface may be a smartphone, a display or any other device capable of depicting the virtual representation.

In a sixth refinement which is combinable with any one of the preceding aspects, refinements and embodiments, the computer-implemented method may further comprise:

generating a set of folding instructions in natural language using the fold list.

In one aspect of the sixth refinement, generating a set of folding instructions may include applying an instructions generation algorithm configured to:

select and obtain for each fold dataset of the fold list an instruction template from a set of predefined instruction template based on the fold properties of the fold dataset, populate each obtained instruction template with the fold properties contained in the respective fold dataset, assign a number to each obtained instruction template based on the position of the respective fold dataset in the fold list, collate the obtained instruction templates into a single document when each instruction template has been populated and numbered, and output the document as folding instructions.

In a seventh refinement which is combinable with any one of the preceding aspects and refinements of the second embodiment, wherein assessing the adherence of the updating fold list to an existing fold list may include applying a fold monitoring algorithm configured to:

real-time monitor each newly occurred fold by comparing each fold dataset newly aggregated to the updating fold list with the corresponding fold dataset of the existing fold list, output a fold discrepancy for each fold property of the compared datasets which are not conforming.

Alternatively or additionally, generating a user output may include applying a fold advice algorithm configured to:

retrieve the fold discrepancies of the newly occurred fold, and generate a prompt or advice outputted to the user via a user-interface.

Additionally, the prompt or advice may comprise visual or audio information notifying the user of a fold discrepancy. Alternatively or additionally, the prompt or advice may comprise a notification informing the user of changes the user needs to make in order to adhere to the selected folding instructions.

In another aspect of the seventh refinement which is combinable with any one of the preceding aspects and refinements of the second embodiment, the user-interface may be a smartphone, a display and/or a sound emitting device.

In another aspect of the seventh refinement which is combinable with any one of the preceding aspects and refinements of the second embodiment, wherein the computer-implemented method may be executed during a user is performing papercraft folding.

The present disclosure further relates to a papercraft digitization system. The papercraft digitization system comprises a sheet provided with an array of RFID tags, an RFID reader and a processing module. The RFID reader is configured to monitor the RFID tags. The processing module is configured to determine the occurrence and fold properties of a fold based on RFID reader output provided by the RFID reader. The processing module is further configured to generate a fold list by storing the fold properties of each occurred fold as a fold dataset.

In one aspect, the papercraft digitization system may be configured to perform the computer-implemented method of any one of the preceding aspects.

In another aspect which is combinable with the preceding aspect, each RFID tag may comprises a transponder circuit and an integrated circuit such as a microchip In another aspect which is combinable with any one of the preceding aspects, each RFID tag may contain an individual tag ID. Alternatively or additionally, each RFID tag may contain an individual resonance frequency. Additionally, the individual tag ID and/or the individual resonance frequency may be stored on a tag database.

In another aspect which is combinable with any one of the preceding aspects, the array of RFID tags may comprise passive RFID tags.

In another aspect which is combinable with any one of the preceding aspects, the RFID tags may be distributed on the sheet at specific individual tag coordinates. The tag coordinates may comprise x-coordinates and y-coordinates. Additionally, the tag coordinates may be stored on a tag database. Alternatively or additionally, the tag coordinates may be linked with a tag ID of the respective RFID tag.

In another aspect which is combinable with any one of the preceding aspects, the RFID tags may be arranged in a predefined pattern on the sheet.

In another aspect which is combinable with any one of the preceding aspects, predefined fold lines may be applied to the sheet according to an existing fold list. In examples, predefined fold lines may be printed onto the sheet according to an existing fold list. Additionally, the RFID tags may be arranged on the sheet in a pattern corresponding to the predefined fold lines. Alternatively or additionally, at least a subset of RFID tags may be arranged laterally on both sides of the respective predefined fold line. Additionally, the RFID rags of a subset which corresponds to a fold line may be arranged laterally from the fold line at similar or substantially the same distances. Alternatively or additionally, the RFID tags of a subset which corresponds to a specific predefined fold line may have the same resonance frequencies. Additionally, the RFID tags of a subset which corresponds to a specific predefined fold line may have resonance frequencies differing from the resonance frequencies of RFID tags of a subset which corresponds to another predefined fold line.

In another aspect which is combinable with any one of the preceding aspects, the array of RFID tags may comprise at least two, more specifically at least 9, most specifically at least 81 RFID tags.

In another aspect which is combinable with any one of the preceding aspects, the RFID tags may be applied on a surface of the sheet. Alternatively or additionally, the RFID tags may be applied into the sheet. Alternatively or additionally, the RFID tags may be printed onto or in the sheet. The RFID tags may be printed by screen printing, by ink jet printing or any other suitable method of application.

In another aspect which is combinable with any one of the preceding aspects, the RFID reader may be configured to send an emitter signal at one or more emission frequencies. The RFID reader may be further configured to receive a return signal at an individual tag resonance frequency from each RFID tag which was stimulated at its resonance frequency. In other words, the RFID may be configured to monitor all or only a subgroup of RFID tags of the array of RFID tags provided on the sheet.

In another aspect which is combinable with any one of the preceding aspects, the RFID reader may be configured to control the emission frequency to preferentially probe the tag resonance frequency of particular RFID tags.

In another aspect which is combinable with any one of the preceding aspects, the RFID reader may be located in a non-portable or portable device, such as a smartphone, internet router.

In another aspect which is combinable with any one of the preceding aspects, the processing module comprises one or more of:
- a tag database for storing tag data including tag IDs, tag coordinates with respect to the sheet, tag resonance frequencies and proximity links (if present),
- a fold database for storing one or more fold lists and/or one or more folding instructions,
- one or more processors for applying at least the algorithms of the computer-implemented method of any one the preceding aspects.

The present disclosure further relates to a fold database containing fold lists which are generated according to the computer-implemented method of any one of the preceding aspects.

The present disclosure further relates to a computer-implemented method for generating a set of folding instructions for creation of a papercraft model comprising:
- obtaining a fold list from a fold database,
- generating a set of folding instructions in natural language using the obtained fold list.

Additionally, the fold list may be obtained from a fold database according to any one of the preceding aspects. Alternatively or additionally, generating a set of folding instructions may include applying an instructions generation algorithm configured to:
- select and obtain for each fold dataset of the fold list an instruction template from a set of predefined instruction templates based on fold properties of the fold dataset,
- populate each obtained instruction template with the fold properties contained in the respective fold dataset,
- assign a number to each obtained instruction template based on the position of the respective fold dataset in the fold list,
- collate the obtained instruction templates into a single document when each instruction template has been populated and numbered, and
- output the document as folding instructions.

It has been found that papercraft folding can be easily digitized by combining papercraft folding with radio frequency identification (RFID) technology. This is implemented by providing a sheet with an array of RFID tags for papercraft folding and monitoring the sheet via an RFID reader. Based on this combined approach an analogue creation of a papercraft model can be digitized. More specifically, the folds (including fold properties) which need to occur on the sheet to create a desired papercraft model can be determined by analyzing information gathered by the RFID reader, i.e. RFID reader output (e.g. return signals of the tags). Thereby, the present disclosure makes use of two basic principles which may be used separately or in a combined approach:
a) Inductive effects when bringing two RFID tags close together.
b) Phase shift between emitted signal and return signal due to spatial position of RFID tag relative to RFID reader.

Inductive effects between two RFID tags may lead to a reduction in return signal strength (RSS). The closer two RFID tags come to each other, the stronger the reduction in RSS will be. Thus, if two RFID tags have a similar decrease in RSS, this may indicate that these two RFID tags are brought in close proximity to each other. There may be used predefined threshold values of decrease in RSS which define how close these two RFID tags must be to trigger a "proximity". Based on the fractional decrease of RSS a proximity value may be determined which indicates a distance between two RFID tags. Analogously to the RSS approach, two RFID tags are estimated to be at the same point in space (i.e. contacting or almost contacting each other) when their return signals exhibit the same phase shift with respect to the emitter signal.

Thus, when performing papercraft folding, different combinations of RFID tags may be brought into measurable proximity at each folding step. The proximity between two RFID tags may be determined by a similar decrease in RSS and/or a similar phase shift. For each combination the system and method may calculate fold properties by evaluating the coordinates of the RFID tags which are brought in measurable proximity. It is to be understood that the coordinates of each RFID tag are known to the system (and method). In that, an occurred fold and its properties which was performed may on the one hand be captured and digitized to be stored for follow-on applications (e.g., to generate folding instructions or to generate a 3D-visualization) in a fold list. On the other hand, a user can be monitored and supported during performing papercraft folding by determining an occurred fold performed by the user and comparing its properties with predefined fold properties.

Apart from real-time monitoring the occurred folds, the present disclosure also enables to digitize a papercraft model which is already completed. Based on the given RSS pattern and/or phase shift pattern, it is known which RFID tags are in proximity on the completed papercraft model. By applying a specific algorithm those folding steps which need to have occurred to result in the current RSS pattern and/or phase shift pattern are calculated reversely.

Following from the above, a user-friendly method for digitizing papercraft creations, such that they can then benefit from the use of digital (e.g. easy sharing, etc.), while retaining the physical product (e.g. working with hands, creating physical art for placement in the home, etc.) can be provided. In detail, an easy method to digitize an analogue papercraft creation with simple consumer hardware and low user-input can be provided (i.e. user just presses a button on the user interface of whatever device reads the RFID tags rather than having 3D cameras, scanning equipment). Furthermore, the present disclosure enables easy sharing of a digital representation of an analogue papercraft design on digital services such as social media. Based on the fold list, the presently disclosed method may create a visual virtual version of the papercraft (3D-visualization). Based on the fold list, the present disclosure further provides a simple method to generate digital instruction sets for the recreation of the analogue papercraft. This allows, for example, automatic creation of instruction sets, or the re-use of the same papercraft materials without fear of losing the creation (i.e. it can be remade easily as steps were recorded). Additionally, a method of direct and personalized feedback to aid in the creation of papercraft can be provided. Finally methods are disclosed which allow for a standardized format for sharing virtual copies of digital papercraft creations. To share their creations, the user needs only to transmit the fold list, which can then be recreated in a virtual form by software at the side of the recipient. This means the sharing of the model is very low bandwidth and data (compared to sharing a 3D model).

DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Embodiments of the computer-implemented method and the papercraft digitization system according to the disclosure will be described with reference to the figures as follows.

In the present disclosure, the term "RFID" is an acronym for radio frequency identification which is a known communication technology in the art and functions on the basis of sending a signal from a reader (also referred to as RFID reader) and receiving an answer signal from a transponder (also referred to as RFID transponder or RFID tag).

In the present disclosure, the term "RFID reader" describes a receiver transmitter unit. The RFID reader is capable of sending an emitter signal over various frequencies which may be preselected. The RFID reader may also be capable of receiving return signals over various frequencies.

In the present disclosure, the term "RFID tag" may be used as a synonym for "RFID transponder" which is a device comprising a transponder circuit (e.g., an antenna) and an integrated circuit (e.g., a microchip). When being stimulated by an emitter signal, the RFID tag is configured to send a return signal. The return signal is characterized by the resonance frequency of the RFID tag which again is determined by the design of its transponder circuit. In other words the resonance frequency of one RFID tag can be distinct from the resonance frequency of another RFID tag based on the specifics of the design of the transponder circuit. For instance, each tag may have a resonance frequency distinct from all other resonance frequencies. In some embodiments, one or more groups of two or more RFID tags may exhibit the same resonance frequency. Thus, by adjusting the frequencies of the emitter signal, the RFID reader is capable of receiving one or more return signals from the RFID tags. For instance, when monitoring the sheet, the RFID reader may only emit frequencies which conform to some of the resonance frequencies of the RFID tags. Then, the RFID reader will also only receive return signals from those RFID tags of the array which were stimulated by their respective resonance frequency. RFID tags may be active (i.e. having a proprietary energy supply) or passive (i.e. having no proprietary energy supply).

In the present disclosure, the term "sheet" is to be understood as a general term for the basis material of a papercraft model in different stages of its creation, i.e. it can circumscribe the papercraft model before the folding process, also referred to as two-dimensional sheet, unfolded sheet or flat sheet, or it can circumscribe the papercraft model at any stage during the folding process or upon the folding process is finished (creation of papercraft model is completed), also referred to as three-dimensional sheet or folded sheet.

Figure 1:
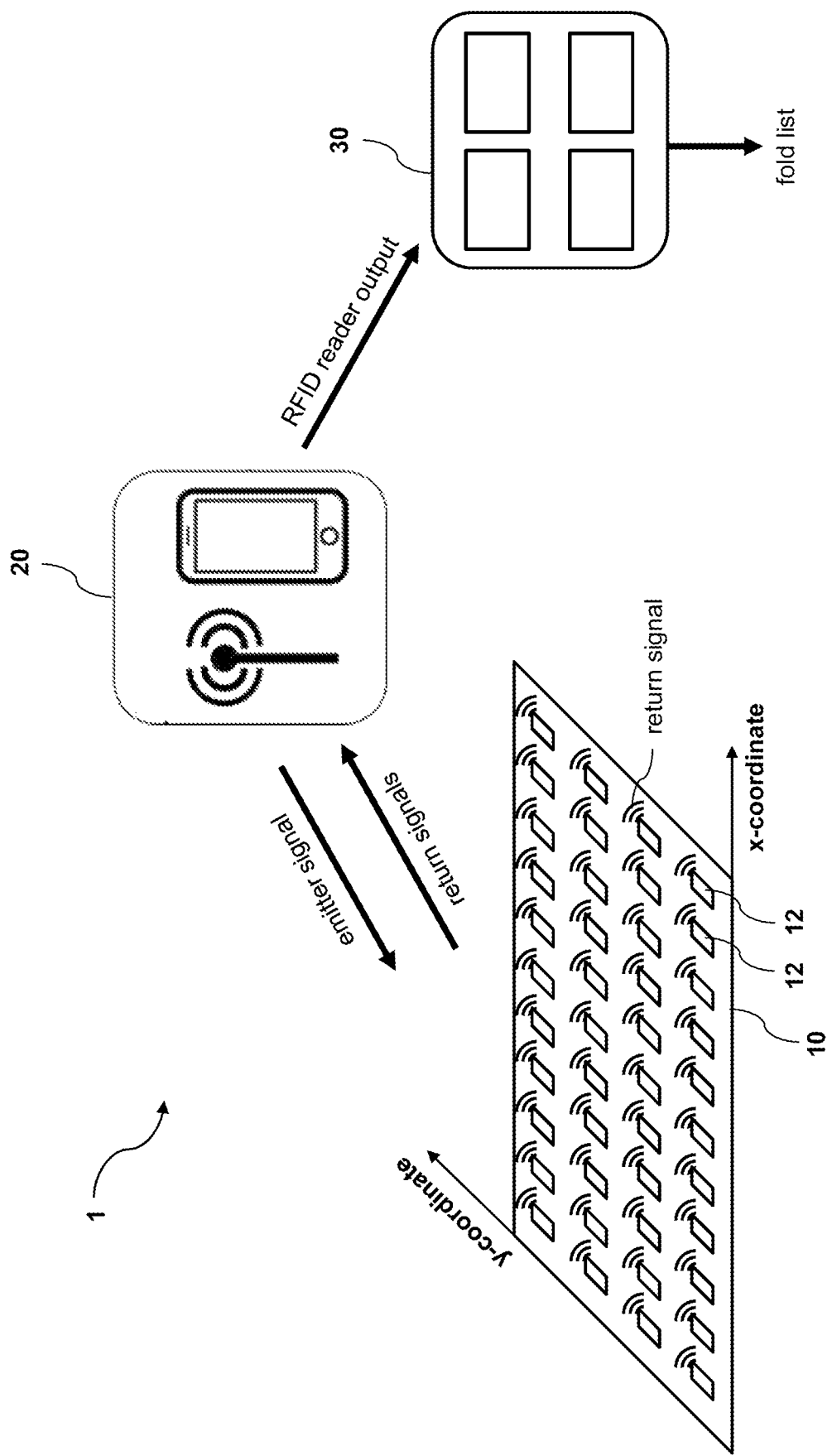
FIG. 1 shows a schematic view of the papercraft digitization system.

FIG. 1 is a schematic view of a papercraft digitization system 1 according to the present disclosure. The papercraft digitization system 1 comprises a sheet 10, an RFID reader 20 and a processing module 30. The sheet 10 is provided with an array of RFID tags 12. The RFID reader 20 is configured to monitor the RFID tags 12. The processing module 30 is configured to determine the occurrence and fold properties of a fold. Therefore, the processing module 30 is configured to analyze RFID reader output provided by the RFID reader 20. The processing module 30 is further configured to generate a fold list by storing the fold properties of each occurred fold as a fold dataset. The generated fold list may be an "existing fold list" or an "updating fold list" depending on the respective follow-on application (will be described in more detail below).

Figure 2:
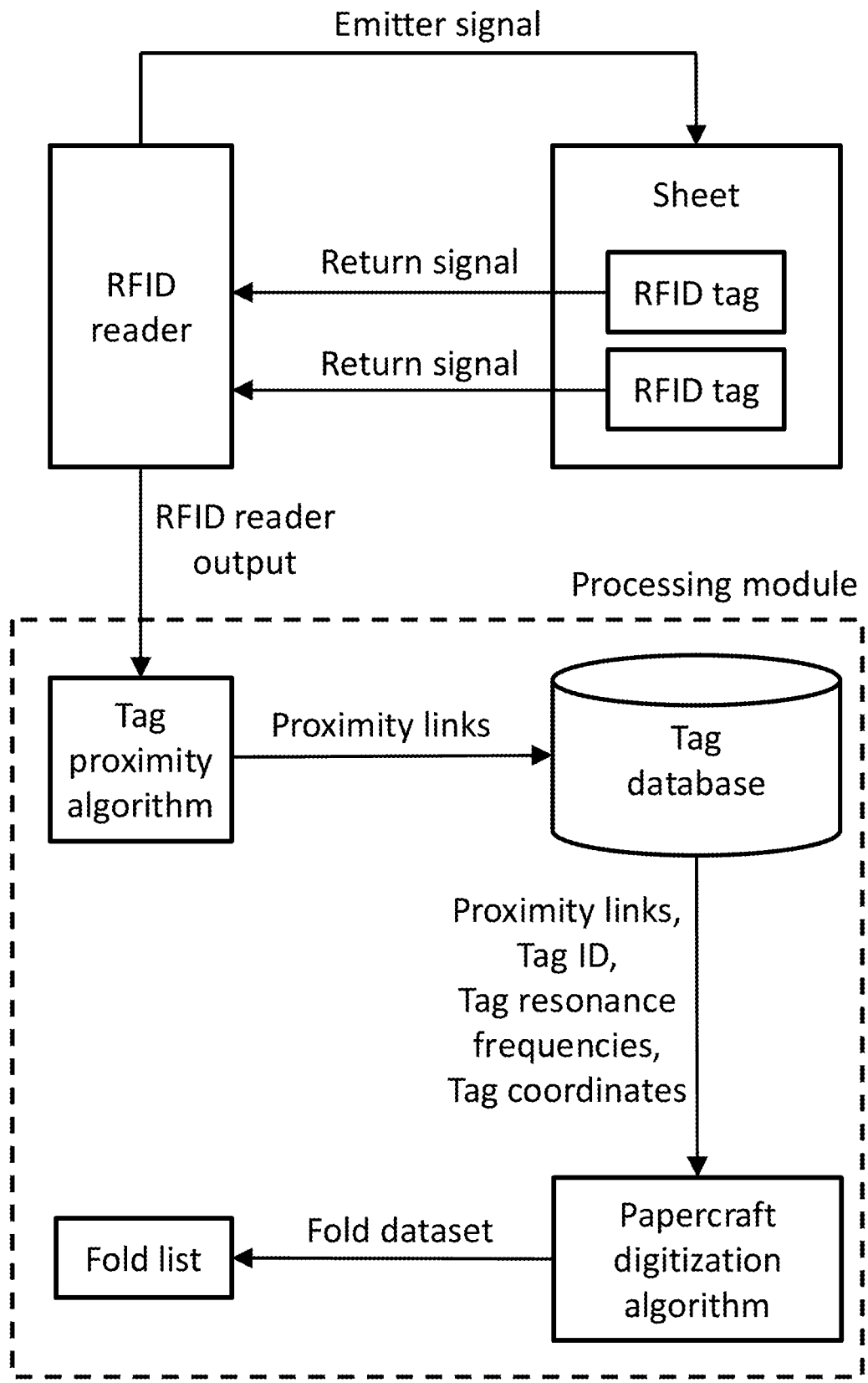
FIG. 2 shows a flow chart of the computer-implemented method carried out by the papercraft digitization system.

With regard to FIGS. 1, 2 and 6, the basic principle of the presently disclosed system and method can be described as follows. The method is started by initializing the papercraft digitization system 1, e.g. by activating the RFID reader 20 (step 601). The RFID reader 20 monitors the sheet 10 by sending an emitter signal and receiving a return signal from the RFID tags 12 (step 603). In one example all RFID tags 12 have the same resonance frequency such that each RFID tag 12 answers with a return signal which is schematically illustrated in FIG. 1. Another example for all RFID tags 12 of the array answering with a return signal whilst having different resonance frequencies would be, for instance, by sending an emitter signal from the RFID reader 20 through all resonance frequencies of the RFID tags 12. However, it is to be understood that also only a subset of RFID tags 12 of the array may be stimulated such that only that subset of RFID tags 12 answers with respective return signals. In the next step, the received return signals are output to the processing module 30 as RFID reader output. The processing module 30 then analyzes the RFID reader output, i.e. the return signals (decrease in return signal strength (RSS) and/or phase shift) and determines if a fold occurred (step 605). If a fold is determined, the processing module 30 further determines the specifics of the fold (i.e. fold properties which may include a mid-point of the fold, a folding angle with respect to a datum of the sheet 10 and a closing angle of the fold) and stores them as a fold dataset (steps 607 and 609). A number of fold datasets may be aggregated to a fold list representing a number of occurred folds which were or are performed on the sheet 10 (step 611). The fold list ("existing fold list") may then be used for follow-on applications (e.g. generating folding instructions or generating a 3D visualization). Alternatively, according to another follow-on application, the fold list may be used as an "updating fold list" to be compared with an "existing fold list" for real-time monitoring a user during creation of a papercraft model (step 613). The determination of a fold and its properties as well as the follow-on applications will be explained in more detail further below after describing further details of the system 1.

The sheet 10 is made of a foldable material such as paper material. In other configurations, the sheet 10 may be made of any other suitable foldable material such as plastic material. In FIG. 1, the array of RFID tags 12 comprises 44 RFID tags 12 whilst in FIG. 3a the array of RFID tags 12 comprises 50 RFID tags 12. However, this should merely be an exemplary number of RFID tags 12 provided on the sheet 10. In any case at least two RFID tags 12 are necessary for determining the occurrence of a fold which will be explained further below in more detail. However a larger number of RFID tags 12 may improve the accuracy of the system (and method). In other words, the accuracy of the determined folds may be improved. It is noted that also the other figures (FIG. 2, FIGS. 3a to 3d, FIGS. 4a and 4b, FIGS. 5a and 5b) merely illustrate an exemplary number of RFID tags 12 provided on the sheet 10. The array of RFID tags 12 may for instance comprise at least 2, 4, 5, 9, 10, 20, 50, 81, 100, 150, 200 or more RFID tags 12.

In the example of FIG. 1, the RFID tags 12 are applied on a first surface of the sheet 10. In alternative configurations, one or more or all RFID tags 12 may be applied into the sheet 12, e.g. in between two layers of the sheet 12. Furthermore, one or more RFID tags 12 may be applied on a second surface of the sheet 10. The latter may improve the accuracy if folds are to be performed on both sides of the sheet 10. The RFID tags 12 may be applied on (or into) the sheet, e.g. by printing the RFID tags 12 on the first surface and/or on the second surface of the sheet 10. For instance, the RFID tags 12 may be printed by screen printing, by ink jet printing or may brought on or into the sheet 10 by any other suitable method of application known in the art.

Each RFID tag 12 comprises a transponder circuit (e.g. antenna) and an integrated circuit such as a microchip. In examples, the array of RFID tags 12 comprises only passive RFID tags. However, in some configurations the array may also comprise one or more active RFID tags.

Each RFID tag 12 contains an individual tag ID, an individual resonance frequency and individual tag coordinates (e.g. x-coordinates and y-coordinates) with respect to the sheet 10. This information may also be referred to as "tag data" and may be stored on a tag database. Thereby, the tag data may be retrieved during various processes of the system and method. The tag data may additionally comprise so-called proximity links which will be explained in more detail further below. Each return signal comprises the individual tag ID which enables to distinguish each return signal from every other return signal. The tag coordinates are linked with the tag ID. The tag resonance frequency is linked with the tag ID.

Figure 3A:
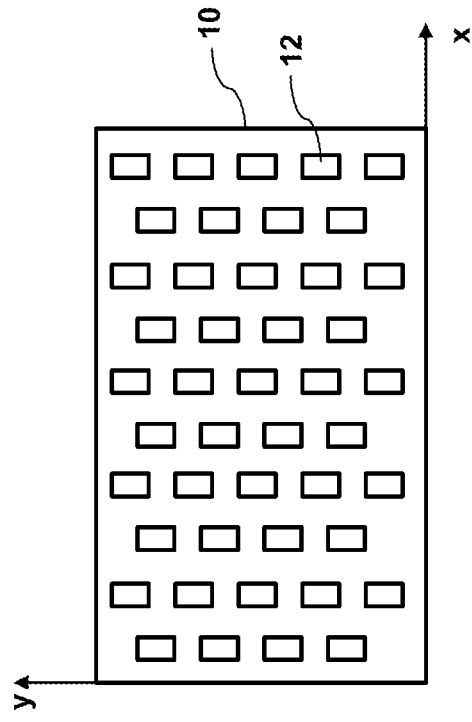
FIGS. 3a-3d show schematic views of different arrangements of the array of RFID tags provided on the sheet of the papercraft digitization system.
Figure 3B:
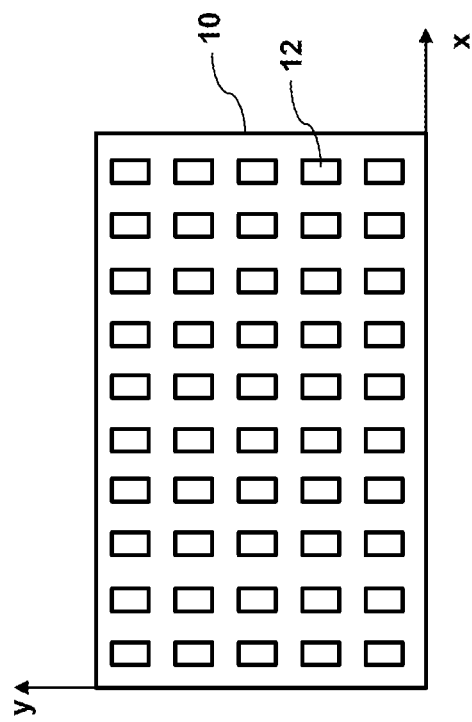
Figure 3C:
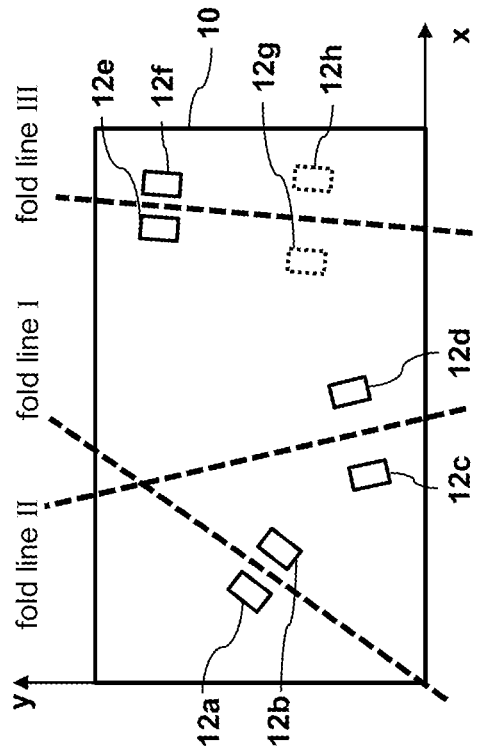

The array of RFID tags 12 may be arranged in a predefined pattern on the sheet 10. Alternatively, the RFID tags 12 may be arranged randomly (i.e. no regular pattern) on the sheet 10 (e.g. but with known coordinates). In general, any geometric pattern of arrangement is possible. For instance, a matrix pattern, in particular a rectangular matrix pattern, as shown in FIGS. 1 and 3a is possible. Alternatively, a round, oval or any other pattern is possible. It should be known to the skilled person, that the arrangement of RFID tags 12 on the sheet 10 also depends on the shape of the sheet 10, which can be for instance, quadratic, rectangular, oval, round or any other shape. The preferred shape, however, may be a rectangular shape with straight columns/rows of RFID tags 12 (FIG. 3a), angled (with respect to edge of sheet 10) columns/rows (FIG. 3c) and/or offset columns/rows of RFID tags (FIG. 3b).

Figure 3D:
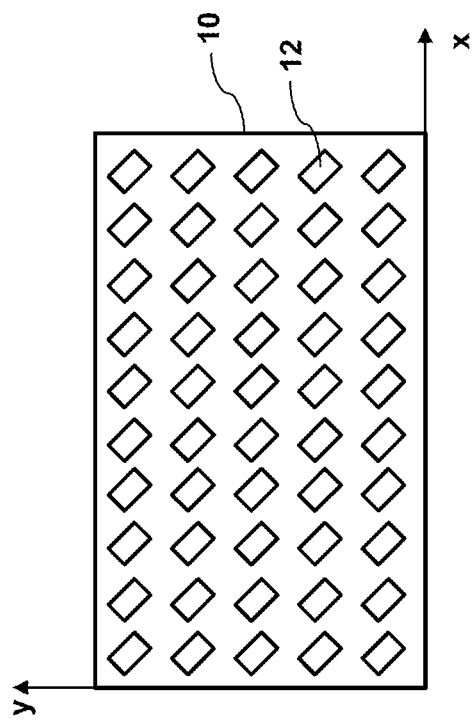

In another configuration, the RFID tags 12 may be arranged on the sheet 10 in a pattern which corresponds to predefined fold lines. In this regard, FIG. 3d shows an exemplary arrangement with various RFID tags 12a-12h. The illustrated RFID tags 12a-12h are not structurally different than the RFID tags 12 of other illustrations but are denoted differently to clearly distinguish them for illustrative purposes. In FIG. 3d, three exemplary fold lines "I", "II" and "III" are depicted. The term "fold line" is to be understood as that line on the sheet 10 along which a fold runs through. A fold line may already be known to the system (for instance, when a user is recreating a papercraft model according to folding instructions) or may be "estimated" based on the type of papercraft model which is to be created (for instance, some types of papercraft models may have more horizontal or more vertical fold lines or may have more fold lines aggregated in one or more specific areas of the sheet). Thus, when a fold line is known or "estimated" (i.e. a predefined fold line), RFID tags 12 may be arranged in a pattern which corresponds to the one or more predefined fold lines. In other words, RFID tags 12 may be arranged to improve the detection or determination of a fold which needs to be performed according to the predefined fold line. This may be accomplished by arranging a subset of RFID tags 12 (at least two) laterally on both sides of the respective predefined fold line. In examples, the subset of RFID tags 12 is arranged laterally of the fold line at similar or substantially the same distances, specifically in a normal direction with respect to the fold line. Thereby, the occurred fold can be determined accurately, as the RFID tags 12 will come into contact or at least proximity when the sheet 10 is folded at the fold line. In the example of FIG. 3d, the subset of RFID tags 12 comprises four couples of RFID tags 12 (12a and 12b, 12c and 12d, 12e and 12f, 12g and 12h). For instance, when performing the fold according to fold line "I", the RFID tags 12a and 12b will approach each other and eventually contact each other (depending on the closing angle of the fold). If the fold according to fold line "I" is performed correctly, the return signals of RFID tags 12a and 12b will exhibit specific measurable properties (e.g. reduction in RSS and/or correlating phase shift) which indicate a proximity between these two RFID tags 12a and 12b. If the mentioned specific properties are not detected, the system (and method) knows that the fold according to fold line "I" has not occurred or has not been performed correctly. Analogously, the correct performance of fold lines "II" and "III" may be detected. Regarding fold line "III", a second couple of RFID tags 12g and 12h is provided. This may improve the accuracy of the detection of this fold as the RFID tags 12e and 12f have to exhibit specific measurable properties, and also the RFID tags 12g and 12h have to exhibit specific measurable properties to determine that the fold according to fold line "III" was performed correct. In other embodiments two or more than two couples of RFID tags 12 may be provided for one or more predefined fold lines. In further embodiments, the subset of RFID tags 12 or specific couples of RFID tags 12 (e.g. 12a and 12b, etc.) which correspond to a specific predefined fold line may have the same resonance frequencies, respectively. Additionally or alternatively, the subset of RFID tags 12 or specific couples of RFID tags 12 (e.g. 12a and 12b, etc.) which correspond to a specific predefined fold line may have resonance frequencies differing from the resonance frequencies of RFID tags 12 which correspond to another predefined fold line. This may further improve the accuracy and efficiency of the detection process. It is to be understood, that besides the specific RFID tags 12 (i.e. 12a, 12b, 12c, etc.) which are arranged in a pattern to correspond to a predefined fold line, further RFID tags 12 may be arranged on the sheet 10 according to any of the previously mentioned arrangements and patterns. Thereby, it may be possible to detect the degree of deviation between the desired fold and the fold performed on the sheet. In some embodiments, the predefined fold lines may be applied, e.g. visually, to the sheet 10 according to an existing fold list. For instance, the predefined fold lines may be printed onto the sheet 10 according to an existing fold list. This may be done independently or in combination with the specific arrangement of RFID tags 12 as described hereinabove.

The RFID tags 12 are distributed on the sheet 10 at specific individual tag coordinates. The tag coordinates comprise x-coordinates and y-coordinates with respect to a datum of the sheet 10 (see, e.g., FIG. 4a). For instance, the datum may be set in the left bottom corner of the sheet 10 as shown, inter alia, in FIG. 4a. The tag coordinates are defined by the center point of the respective RFID tag 12. The individual tag coordinates may be linked with the individual tag ID of the respective RFID tag 12. Thereby, a return signal can be unambiguously linked to a specific RFID tag 12, and thus, to a specific location on the sheet 10. It is to be understood that the coordinates are fixed coordinates, i.e. the coordinates are fixed with respect to the sheet 10. The tag coordinates are known to the system (and method). Some or all of the array of RFID tags 12 may be arranged equidistant in x- and/or y-direction (see, e.g., FIG. 1). In other embodiments, some or all of the array of RFID tags 12 may be arranged at different distances. The RFID tags 12 may be distanced from each other (i.e. distance to the next adjacent RFID tag) by at least 0.5 mm to 50 mm, specifically 1 mm to 30 mm, most specifically 5 mm to 15 mm. Depending on the size of the sheet 10 and/or on the size of the RFID tags 12 and/or on the fold properties or number of folds to be performed to create a specific papercraft model, the distance between two adjacent RFID tags 12 may be smaller than 0.5 mm or larger than 50 mm. For instance, if only one fold is to be performed through a center diagonal fold line of the sheet 10, it may be sufficient to arrange two RFID tags 12 at opposing corners of the sheet 10. In some embodiments, at least a subgroup of one or more RFID tags 12 may be arranged at or close to one or more edges of the sheet 10. This may lead to a better accuracy in determining the fold properties, in particular to a better accuracy in determining the point where the fold line intersects with an edge of the sheet 10. It is noted, that other coordinate systems, e.g. polar coordinates, and/or other datums than a corner of sheet 10, e.g. center point of the sheet 10, may be used. The choice of an adequate coordinate system and/or adequate datum may depend, for instance, on the shape of the sheet 10.

The RFID reader 20 is configured to send an emitter signal at one or more emission frequencies. The RFID reader 20 is further configured to receive a return signal at an individual tag resonance frequency from each RFID tag 12 which was stimulated at its resonance frequency. In other words, the RFID reader 20 may be configured to monitor all or only a subgroup of RFID tags 12 of the array of RFID tags 12 provided on the sheet 10. If different emission frequencies are used, the RFID reader 20 may be configured to control the emission frequencies to preferentially probe the tag resonance frequency of particular RFID tags 12. Thereby, the monitoring field can be restricted to specific task and/or areas which are likely to take place. In some embodiments, the RFID reader 20 may be located in a non-portable or portable device, such as a smartphone, internet router or any other suitable device. In other embodiments, the RFID reader 20 may be a solitary device independent from other devices.

The processing module 30 comprises a tag database, a fold database (not depicted) and one or more processors (not depicted) for performing a tag proximity algorithm and a papercraft digitization algorithm. In other embodiments, the tag database and/or the fold database may be comprised in separate devices or may be provided separately. The tag database is configured for storing tag data including tag IDs, tag coordinates with respect to the sheet, tag resonance frequencies and proximity links (if present). The fold database is configured for storing one or more fold lists and/or one or more folding instructions and/or one or more virtual representations of papercraft models. The one or more processors may be further configured for performing a fold render algorithm, an instruction generation algorithm, a fold monitoring algorithm and/or a fold advice algorithm.

The papercraft digitization system may further comprise a user-interface for displaying a graphical representation of the fold list and/or for providing information and/or notifications to a user. The user-interface may be located in a non-portable or portable device, such as a smartphone, a RFID reader 20 or any other suitable device. In other embodiments, the user-interface may be a solitary device independent from other devices.

The papercraft digitization system 1 is configured to perform the computer-implemented method for digitization of papercraft folding for creation of a papercraft model which will be described in more detail in the following.

As already explained above, the computer-implemented method for digitization of papercraft folding for creation of a papercraft model comprises monitoring the sheet by sending an emitter signal and receiving one or more return signals from the RFID tags. In FIG. 2, an exemplary flow chart of the principle of the method is depicted. In this example, the RFID reader receives a respective return signal from two RFID tags. As explained above, the number of return signals received is dependent on the number of RFID tags, and the resonance frequencies stimulated by the emitter signal. That means, some or all of the RFID tags of the array of RFID tags may be monitored by the RFID reader. The received return signals are output from the RFID reader as "RFID reader output".

In the next step, the RFID reader output is used to determine the occurrence of a fold (i.e. an occurred fold). In other words, the RFID reader output is obtained and analyzed. That means, the return signals are analyzed to determine the presence of an occurred fold (i.e. to determine the occurrence of a fold).

The principle which is applied here, may be called RFID tag mutual identification. Based on this principle a proximity of two or more RFID tags, specifically passive (i.e. unpowered) RFID tags, may be detected at distance by an RFID reader. This principle utilizes the independent recognition of two properties of the signal returned to the RFID reader: return signal strength (RSS) and phase difference. Due to the inductive effects between two proximate RFID tags, when two tags are brought close together (i.e. touching or almost touching), there is a significant and measurable decrease in the RSS from both RFID tags. Therefore, it is possible to identify that any single RFID tag is proximate to another RFID tag. The stronger the decrease in RSS, the closer the RFID tags are. In other words, the closer the RFID tags, the more mutual inductance will occur, so the RSS from both RFID tags will be weaker the closer the tags are. Using phase difference, relies on measurement of the phase shift of the returned signal with respect to the emitter signal. Phase shift increases with distance between RFID tag and RFID reader. If two RFID tags are in the exact same point in space, they should have identical phase shifts in their returned signals when read by the same RFID reader. For any two RFID tags which are at the same point in space (i.e. they are in contact, or almost in contact), the phase shift of their return signals should be equal. Therefore, individual RFID tag pairings may be identified. The closer the phase shifts are (i.e. the smaller the difference in phase shift), the closer the RFID tags are. Both properties may independently or in combination be used to determine a proximity between the RFID tags. The present disclosure makes use of this principle by concluding from a determined proximity between two or more RFID tags the occurrence of a fold which must have taken place to bring these two or more RFID tags in contact or proximity. From the known geometric arrangement of the RFID tags (i.e. tag coordinates) also the fold properties can be concluded.

Therefore, the computer-implemented method applies a tag proximity algorithm to determine the occurrence of a fold. In other words, the tag proximity algorithm analyzes the return signals to evaluate a proximity between two or more RFID tags. If a proximity is determined, the tag proximity algorithm generates a proximity link between the RFID tags proximity is determined for. The proximity link includes tag IDs of the RFID tags proximity was determined for. The proximity link may be binary or may include a proximity value. The proximity value takes into account a magnitude of proximity, i.e. a change of relative distance between the RFID tags proximity was determined for. In examples, the proximity value is calculated from a magnitude of correlating RSS reduction (specifically, for the return signal strength approach). Alternatively, the proximity value is calculated from a size of the differences in phase shift (specifically, for the phase shift method). In some examples, the proximity value is calculated from a combination of both, i.e. magnitude of correlating RSS reduction and a size of the differences in phase shift. Eventually, by outputting one or more proximity links, the occurrence of a fold is determined by the tag proximity algorithm. The one or more proximity links may then be stored on the tag database relating them to the tag IDs of the RFID tags proximity was determined for. In some embodiments, the tag proximity algorithm may be further configured to initiate a papercraft digitization algorithm upon recognition of a new proximity link.

The term "proximity" is to be understood as a relative term which is determined by the tag proximity algorithm if a predefined threshold condition is met. Only if the threshold condition is met the generation of a proximity link is triggered and the proximity link is stored on the tag database. Hence, the tag proximity algorithm determines return signal properties (RSS and/or phase shift) of each received return signal. The tag proximity algorithm then compares the return signal properties (RSS and/or phase shift) of a received return signal of each RFID tag with the return signal properties (RSS and/or phase shift) of a received return signal of every other RFID tag. If the compared return signal properties (RSS and/or phase shift) correlate within the predefined threshold a proximity between the respective RFID tags is determined and a proximity link is generated and stored. In other words, if the compared return signal properties (RSS and/or phase shift) correlate within the predefined threshold the occurrence of a fold is concluded.

As mentioned above, analyzing the return signals comprises analyzing one or more of the return signal properties. In detail analyzing the return signals comprises analyzing RSS and/or phase shift of a received return signal.

Analyzing RSS comprises determining a change, in particular a relative change, of return signal strength of a received return signal with respect to a reference value. The relative change of return signal strength of a received return signal is determined by a comparison with the return signal strength of a previously received return signal of the same RFID tag. Alternatively the change of return signal strength of a received return signal is determined by a comparison with a known standard value of return signal strength of the same RFID tag. This is done for each received return signal (i.e. for the return signal of each RFID tag) such that for each received return signal a relative change of RSS is determined. It is noted that unitary reference values are to be chosen, i.e. either respective standard values or respective previously received values.

Furthermore, it is noted that the relative change of RSS may be expressed as a percentage value (e.g. 10%) or as a decimal value (e.g. 0.1). Then the relative changes of RSS of the different RFID tags are compared with each other. A proximity between two or more RFID tags is determined if two conditions are met:
 the changes of RSS are correlating within predefined tolerance intervals, and
 the changes of RSS are within a predefined threshold.

The correlation-condition is fulfilled if the changes of RSS are the same within a tolerance interval of at most +/−10%, particularly at most +/−5%, and more particularly at most +/−1%. These tolerance intervals may merely represent exemplary values and may be determined (e.g. experimentally) individually for each type of papercraft model. The threshold-condition is fulfilled if the changes of RSS is ≤−15%, particularly ≤−25%, more particularly ≤−50%, and most particularly ≤−80%. In other words, the threshold-condition is fulfilled if a decrease of RSS is at least 15%, particularly at least 25%, more particularly at least 50%, and most particularly at least 80%. If both conditions are met, the generation of a proximity link comprising the respective tag IDs is triggered. The proximity link reflects that proximity between two or more RFID tags is determined within the predefined conditions/thresholds (binary proximity link which assumes value of 1 if conditions are met). In examples, the proximity link further includes a proximity value which reflects the magnitude of proximity. The proximity value may be translated from an averaged change of RSS of the respective RFID tags. For instance, if the return signals of two RFID tags have a decrease of RSS of 84% and 86%, respectively (i.e. a change of RSS of −84% and −86%, respectively), the proximity value may be 0.85. Analogously, if the return signals of two RFID tags both have a decrease of RSS of 95% (i.e. a change of RSS of −95%), the proximity value may be 0.95. In the following step of determining fold properties, the proximity values may, for instance, be used to determine the closing angle of the fold. The decrease of RSS correlates with the distance between the RFID tags. For instance, two RFID tags being 2 mm apart may both see an 80% RSS reduction, and two RFID tags being 5 mm apart may both see a 50% RSS reduction. These values should be understood as merely exemplary values and may depend on the specifics (structure, frequency, standard signal strength, etc.) of the RFID reader and the RFID tags.

Analyzing phase shift comprises calculating a phase shift between a received return signal and the emitter signal. This is done for each received return signal such that for each received return signal a phase shift is determined. Then the phase shifts of the different RFID tags are compared with each other. A proximity between two or more RFID tags is determined if their respective phase shifts are substantially equal within a tolerance interval. A proximity between two RFID tags is determined if their respective phase shifts are substantially equal within a predefined tolerance interval of −15% to +15%, particularly within −10% to +10%, more particularly within −5% to +5% and most particularly within −2.5% to +2.5%. The proximity link includes a proximity value which is calculated from a deviation of phase shifts of the RFID tags proximity was determined for. Alternatively a binary-type proximity link may be used which assumes the value of 1 if the phase shifts correlate within the predefined tolerance interval.

In the next step, after determining the occurrence of a fold by generating one or more proximity links, the one or more proximity links are used to determine the fold properties of an occurred fold. Therefore, the computer-implemented method applies a papercraft digitization algorithm to calculate fold properties of each fold based on tag data of the RFID tags. The tag data includes for each RFID tag a tag ID, predefined tag coordinates with respect to the sheet, a tag resonance frequency, a proximity link, if present. The tag data is stored on a tag database (see, e.g. FIG. 2).

The papercraft digitization algorithm retrieves the tag data from the tag database. Then, the papercraft digitization algorithm calculates the fold properties including a mid-point of the of the occurred fold, a folding angle of the occurred fold with respect to a datum of the sheet and, e.g. if proximity values are present, a closing angle of the occurred fold. The calculation of the fold properties of the occurred fold will be described in the following with respect to an exemplary fold line depicted in FIGS. 4a, 4b, 5a and 5b.

Figure 4A:
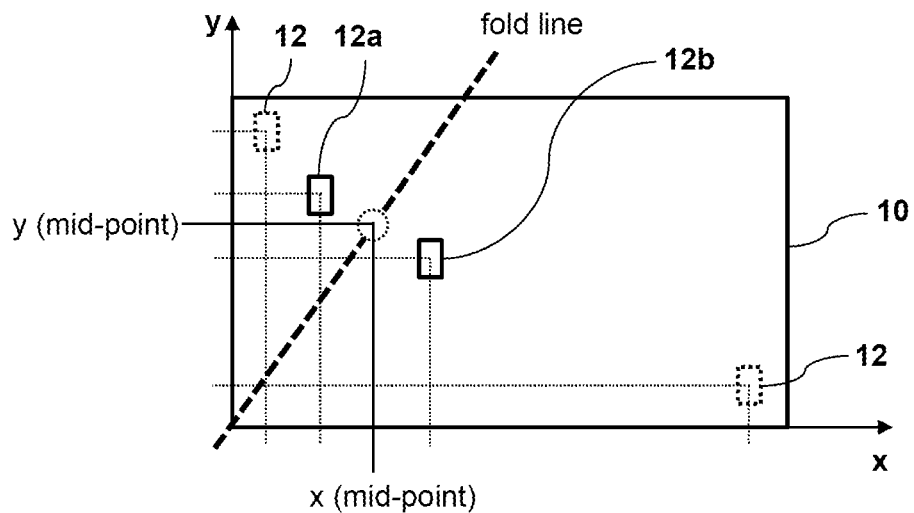
FIG. 4a shows a schematic top view of the sheet depicting the x- and y-coordinates of selected RFID tags and of a mid-point of an exemplary fold line.

FIG. 4a schematically depicts a sheet 10 with two RFID tags 12a and 12b a proximity link was generated for. For illustrative purpose two more exemplary RFID tags 12 are depicted. For these further RFID tags 12, however, no proximity was detected and thus no proximity link was generated. Furthermore, FIG. 4a exemplary shows a fold line which represents the occurred fold (i.e. a line on the sheet 10 through which the occurred fold is estimated to run through). A mid-point of the occurred fold is now calculated by averaging x-coordinates and y-coordinates of the RFID tags 12a and 12b being correlated by the proximity link which is retrieved from the tag database. This is possible as the proximity link contains the tag IDs of the RFID tags 12a and 12b. Based on the tag IDs of the RFID tags 12a and 12b, the papercraft digitization algorithm can retrieve the respective x- and y-coordinates from the tag database. The calculated mid-point is schematically depicted by the cross-lined circle between the RFID tags 12a and 12b.

Figure 4B:
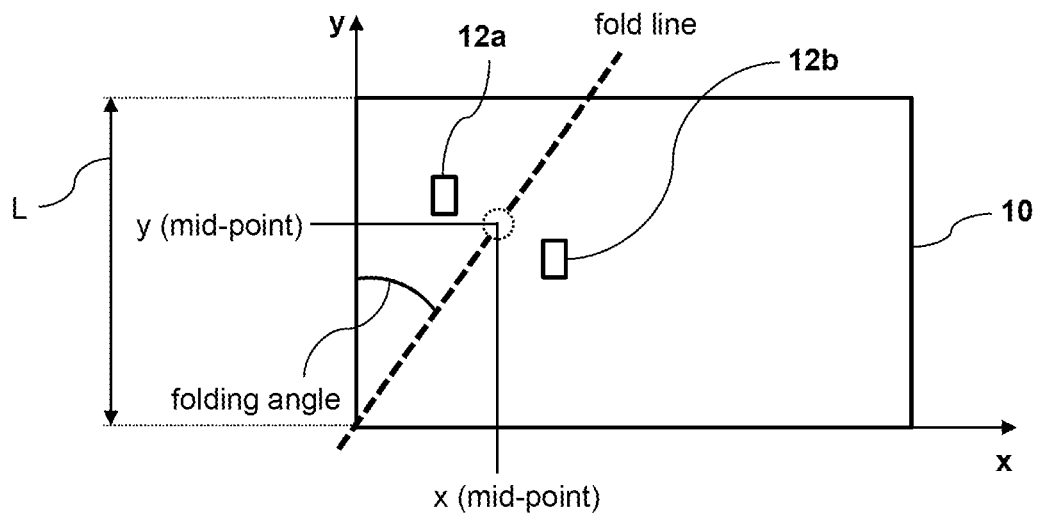
FIG. 4b shows the folding angle of the exemplary fold line according to FIG. 4a with respect to an exemplary datum L.

FIG. 4b depicts the same fold line as FIG. 4a and further shows the folding angle of the occurred fold with respect to a datum of the sheet 10. In this exemplary configuration, the datum is the left edge of the sheet 10 having a length L. The folding angle of the occurred fold is determined by using trigonometry and the x- and y-coordinates of the previously calculated mid-point. For instance, the folding angle may be calculated by (arctan((L-y)/x)). Alternatively, x- and y-coordinates of a function or vector of the fold line may be calculated based on the x- and y-coordinates of the mid-point and/or the x- and y-coordinates of the RFID tags 12a and 12b. This may be done, e.g. by determining a straight line which is orthogonal to a connection line between the RFID tags 12a and 12b and which runs through the mid-point. Based on the function or vector, the folding angle and/or the points where the fold line intersects with the edges of the sheet 10 may be determined using known mathematical approaches, e.g. trigonometry. In some embodiments, more than one mid-point may be determined (if further proximity links have been generated). Based on the more than one mid-point a function or vector of the fold line may be calculated based on the x- and y-coordinates of the more than one mid-point and/or the x- and y-coordinates of the RFID tags 12a and 12b. Based on the function or vector, the folding angle and/or the points where the fold line intersects with the edges of the sheet 10 may be determined using known mathematical approaches, e.g. trigonometry.

Figure 5A:
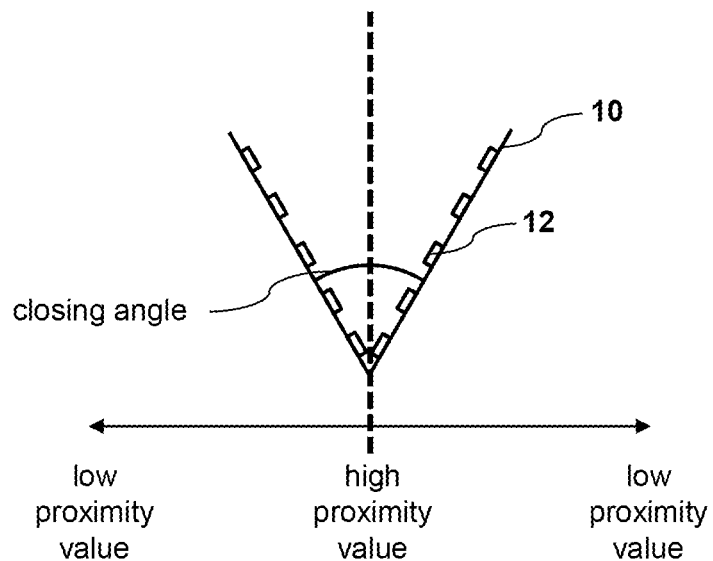
FIG. 5a is a schematic side view of a folded sheet illustrating the closing angle of the fold.
Figure 5B:
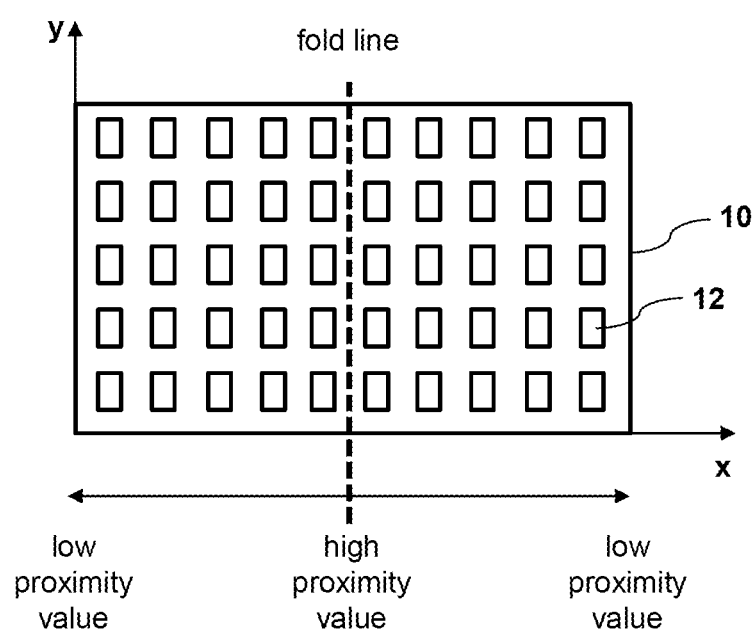
FIG. 5b is a schematic coordinate view of the folded sheet according to FIG. 5a illustrating the fold line and decreasing proximity values.

FIGS. 5a and 5b illustrate the principle of determining the closing angle of the occurred fold. The determination of the closing angle is specifically applicable, if proximity links with proximity values are used. The closing angle is to be understood as that angle between those parts of the sheet 10 which are folded towards each other. Thus, the closing angle may regularly assume values between 0° and <180°, specifically between 0° and <90°, more specifically between 0° and <45°. In the exemplary configuration of FIG. 5a, the closing angle is approximately 60°. It is noted that in FIG. 5a the RFID tags 12 are depicted protruding from a surface of the sheet 10 for illustrative purposes only. It should be understood that in the real application the RFID tags 12 are not protruding or only minimally protruding from the surface of the sheet 10. In some examples, the RFID tags are embedded within layers of sheet (i.e. not even visible). In examples, the RFID tags are printed on the surface of the sheet. The printing thickness may be about 0.001 mm to about 0.10 mm, specifically about 0.005 mm to about 0.05 mm, more specifically substantially about 0.01 mm. Assuming that proximity links including proximity values are generated for all present RFID tags, the closing angle may now be determined based on a change rate of proximity values of RFID tags distanced further away from the fold line in a normal direction. Therefore, FIG. 5b schematically illustrates the sheet 10 provided with the RFID tags 12 and the exemplary fold line of the occurred fold. The closing angle is determined by assessing a series of proximity values of RFID tags arranged along a normal direction with respect to the fold line and in an increasing distance from the fold line. Then a conversion factor may be applied to the series of proximity values to obtain the closing angle. For instance, a strong decrease of proximity values along the series from close to the fold line towards further away from the fold line may result in a larger closing angle. A smaller decrease of proximity values along the series from close to the fold line towards further away from the fold line may result in a smaller closing angle. As explained further above, the proximity value takes into account a magnitude of proximity.

When the fold properties are calculated, they are stored as a fold dataset. In other words, the mid-point, the folding angle, in examples the function or vector of the fold line including intersection points, and/or the closing angle are accumulated in a fold dataset. The term "fold dataset" describes a set of fold properties of one occurred fold. The fold dataset may be added to a fold list.

Example Method 1

Figure 7:
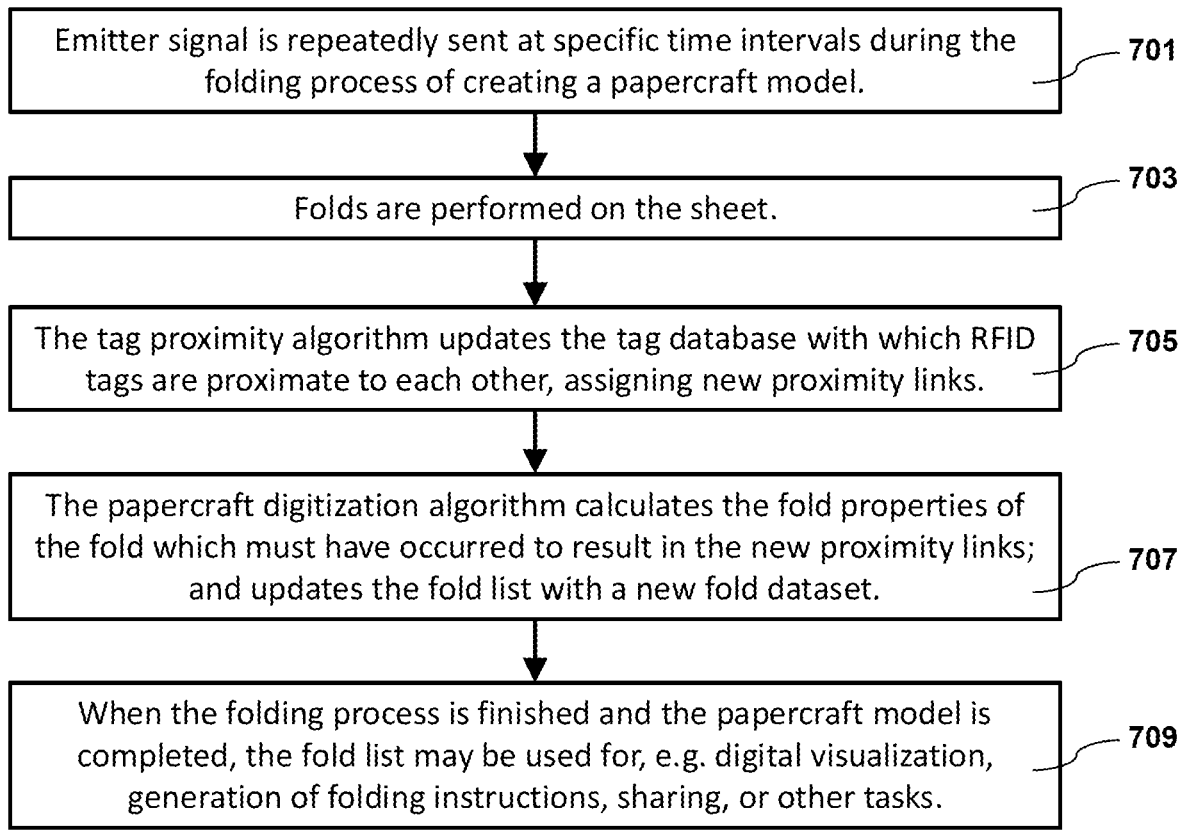
FIG. 7 shows method steps of a first example configuration of the computer-implemented method carried out in real-time.

With respect to FIG. 7, a first example of carrying out the computer-implemented method is described. An emitter signal is repeatedly sent at specific time intervals during the folding process of creating a papercraft model (step 701). Folds are performed on the sheet (step 703). The tag proximity algorithm updates the tag database with which RFID tags are proximate to each other, assigning new proximity links (step 705). The papercraft digitization algorithm calculates the fold properties of the fold which must have occurred to result in the new proximity links and updates the fold list with a new fold dataset (step 707). Thereby an order of folds can be created according to the position of the respective time interval in the time series. When the folding process is finished and the papercraft model is completed, the fold list may be used for, e.g. digital visualization, generation of folding instructions, sharing, or other tasks (step 709).

In an alternative variation of the first example method, the computer-implemented method is executed in real-time during the creation process of folding. The emitter signal is repeatedly sent at specific time intervals. The time interval between two emitter signals may be selected to secure that a maximum of one fold is performed during the time interval. The time interval may be determined by a sampling rate which may have a frequency of at least 0.1 Hz, particularly at least 1 Hz, specifically at least 5 Hz and more particularly at least 10 Hz. A set of return signals is repeatedly received at each time interval. The set of return signals contains a return signal received from each of the RFID tags. It is noted that the set of return signals only contains a respective return signal from those RFID tags which have been probed with their resonance frequency. The repeatedly received sets of return signals forms a time series of sets of return signals. Each set of return signals of the time series is analyzed by applying the tag proximity algorithm. Each set of return signals of the time series may be analyzed by comparing a newly received set of return signals with a set of return signals received at a previous, specifically immediately previous, time interval. A set of new proximity links is generated at each time interval if proximity is determined. Fold properties are determined for each new set of proximity links. Thereby, fold properties of a fold which must have occurred in the new set of proximity links are calculated. For each set of new proximity links the fold properties are added as a new fold dataset in the fold list. In other words, a sequence of fold datasets is generated which represents the fold list. Thereby an order of folds can be created according to the position of the respective time interval in the time series. When the folding process is finished, i.e. when the papercraft model is complete, the fold list may be used further follow-on applications (e.g. 3D visualization, generation of folding instructions, etc.).

In a further alternative variation of the first example method, the sheet is repeatedly monitored at regular time intervals. A time series of sets of return signals is received from the RFID tags and analyzed. Return signals are compared within the set of return signals received at the same time interval and/or with one or more sets of return signals over previous time intervals. Based on the comparison, fold properties of occurred folds are calculated which must have taken place in order to receive the present set of return signals. The fold properties are stored as fold datasets.

Example Method 2

Figure 8:
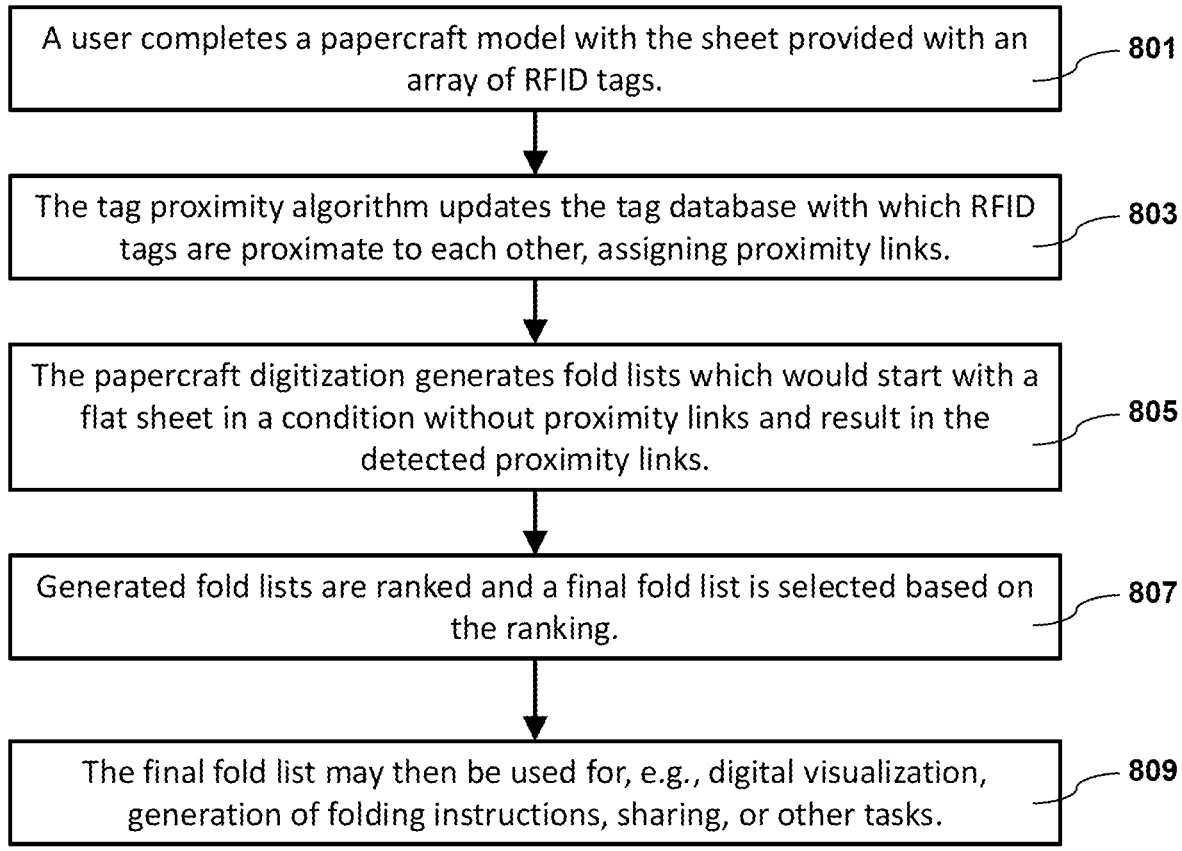
FIG. 8 shows method steps of a second example configuration of the computer-implemented method carried out after creation.

With respect to FIG. 8, a second example of carrying out the computer-implemented method is described. A user completes a papercraft model with the sheet provided with an array of RFID tags (step 801). The tag proximity algorithm updates the tag database with which RFID tags are proximate to each other, assigning proximity links (step 803). The papercraft digitization generates fold lists which would start with a flat sheet in a condition without proximity links and result in the detected proximity links (step 805). Generated fold lists are ranked, and a final fold list is selected based on the ranking (step 807). The final fold list may then be used for, e.g., digital visualization, generation of folding instructions, sharing, or other tasks (step 809).

In an alternative variation of the second example method, the computer-implemented method is executed after the creation process of folding is completed. The emitter signal is sent at least once to receive at least one set of return signals. Determining the fold properties of an occurred fold comprises applying a papercraft digitization algorithm configured to reverse-generate a fold list including the fold datasets of folds which must have occurred based on the present set of proximity links determined from the at least one set of return signals. The reverse-generating includes virtually unfolding the sheet to reach a state of zero proximity links, generating possible lists of unfolds resulting in a completely unfolded sheet, ranking the generated lists of unfolds, selecting one list of unfolds based on given parameters, such as a number of fewest unfolds, and reversing the selected list of unfolds to obtain a fold list.

Follow-on Applications

The computer-implemented method according to the present disclosure further includes various follow-on application steps which are performed after the fold properties of an occurred fold have been determined and the fold properties have been stored as a fold dataset.

Figure 6:
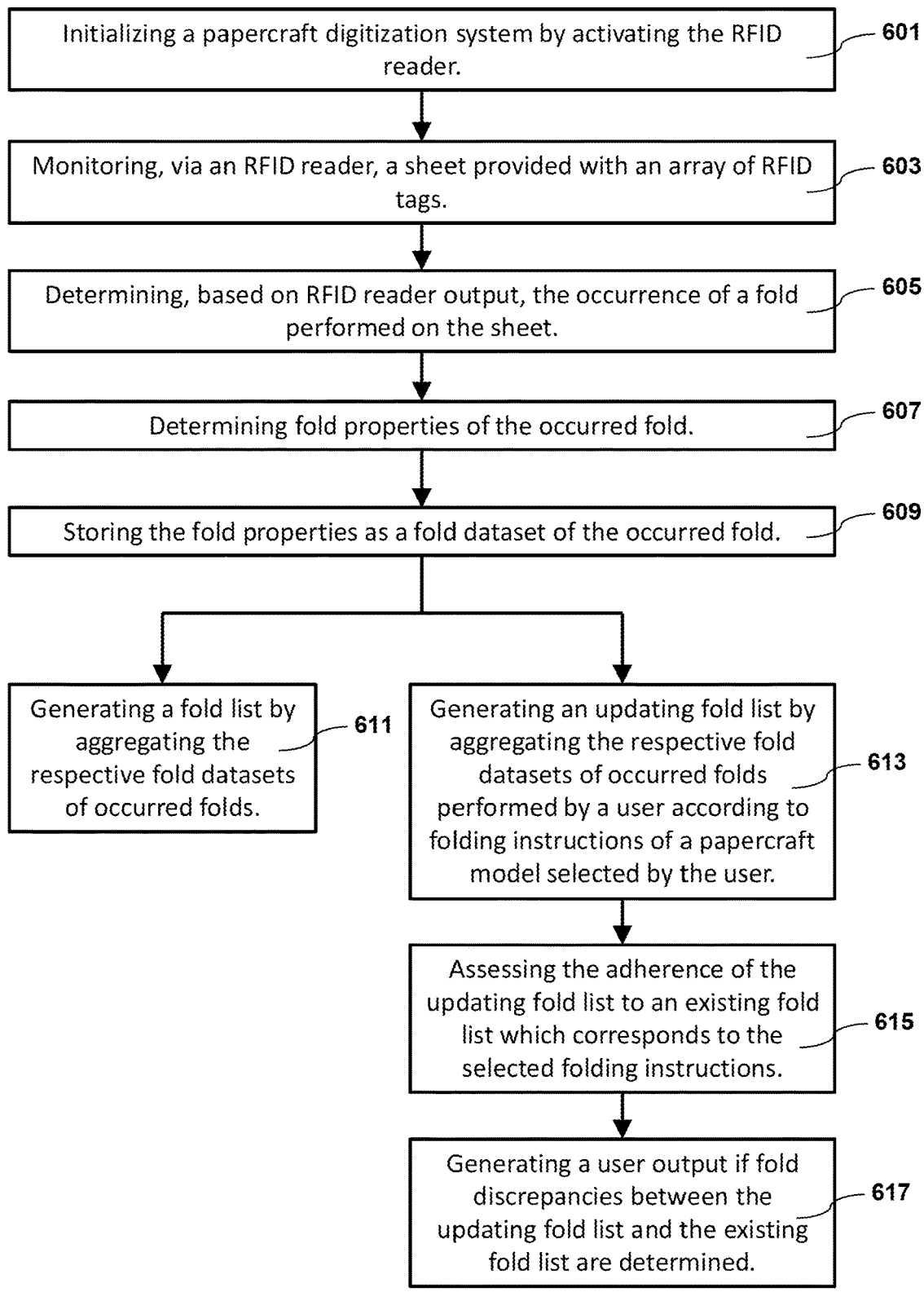
FIG. 6 shows general method steps of the computer-implemented method.

The computer-implemented method further comprises generating a fold list by aggregating the respective fold datasets of occurred folds (see, FIG. 6 left trace). In other words, the fold datasets are stored in a fold list, specifically on a fold database. Each row of the fold list contains data, i.e. a fold dataset (fold properties), related to a single fold. The data includes mid-point coordinates of the fold, folding angle with respect to datum, in examples a function or vector and intersection points of the fold line, and/or a closing angle. The herewith obtained fold list may also be referred to as "existing fold list".

In a first application, the computer-implemented method further comprises applying the fold list to a virtual representation of the sheet and displaying the virtual representation via a user-interface. Applying the fold list to a virtual representation of the sheet includes applying a fold render algorithm. The fold render algorithm creates a three-dimensional mesh model of the sheet in an unfolded state. Then the fold render algorithm applies the fold datasets from the fold list, specifically one at a time. And finally, the fold render algorithm recalculates the mesh model with each application of a fold dataset. The fold render algorithm is configured to store the mesh model after the application of all fold datasets as a virtual representation of the sheet representing the sheet in a completely folded state. The fold render algorithm may be further configured to store the mesh model at different stages of the application of fold datasets as a virtual representation of the sheet representing the sheet in a folded state. The user-interface is configured to allow a user to view, move and/or edit the virtual representation. The user-interface may be a smartphone, a display or any other device capable of visualizing and/or manipulating the virtual representation.

In a second application, the computer-implemented method further comprises generating a set of folding instructions in natural language using the fold list. Generating a set of folding instructions includes applying an instructions generation algorithm. The instructions generation algorithm selects and obtains for each fold dataset of the fold list an instruction template from a set of predefined instruction templates based on the fold properties of the fold dataset. Then the instructions generation algorithm populates each obtained instruction template with the fold properties contained in the respective fold dataset and assigns a number to each obtained instruction template based on the position of the respective fold dataset in the fold list. When each instruction template has been populated and numbered, the instructions generation algorithm collates the obtained instruction templates into a single document and outputs the document as folding instructions.

In a third application, the computer-implemented method further comprises generating a fold list by aggregating the respective fold datasets of occurred folds (see, FIG. 6 right trace). In comparison to the previous two applications, in this application an updating fold list is generated by aggregating the respective fold datasets of occurred folds performed by a user according to folding instructions of a papercraft model selected by the user. Then the adherence of the updating fold list to an existing fold list which corresponds to the selected folding instructions is assessed (step 615). If fold discrepancies between the updating fold list and the existing fold list are determined a user output is generated. Assessing the adherence of the updating fold list to the existing fold list includes applying a fold monitoring algorithm. The fold monitoring algorithm real-time monitors each newly occurred fold by comparing each fold dataset newly aggregated to the updating fold list with the corresponding fold dataset of the existing fold list. For each fold property of the compared datasets which are not conforming, the fold monitoring algorithm outputs a fold discrepancy (step 617). Generating a user output includes applying a fold advice algorithm. The fold advice algorithm retrieves the fold discrepancies of the newly occurred fold and generates a prompt or advice outputted to the user via a user-interface. The prompt or advice may comprise visual or audio information notifying the user of a fold discrepancy. The prompt or advice may comprise a notification informing the user of changes the user needs to make in order to adhere to the selected folding instructions. The user-interface may be a smartphone, a display and/or a sound emitting device, or any other suitable device known in the art. The computer-implemented method is executed during a user is performing papercraft folding.

Figure 9:
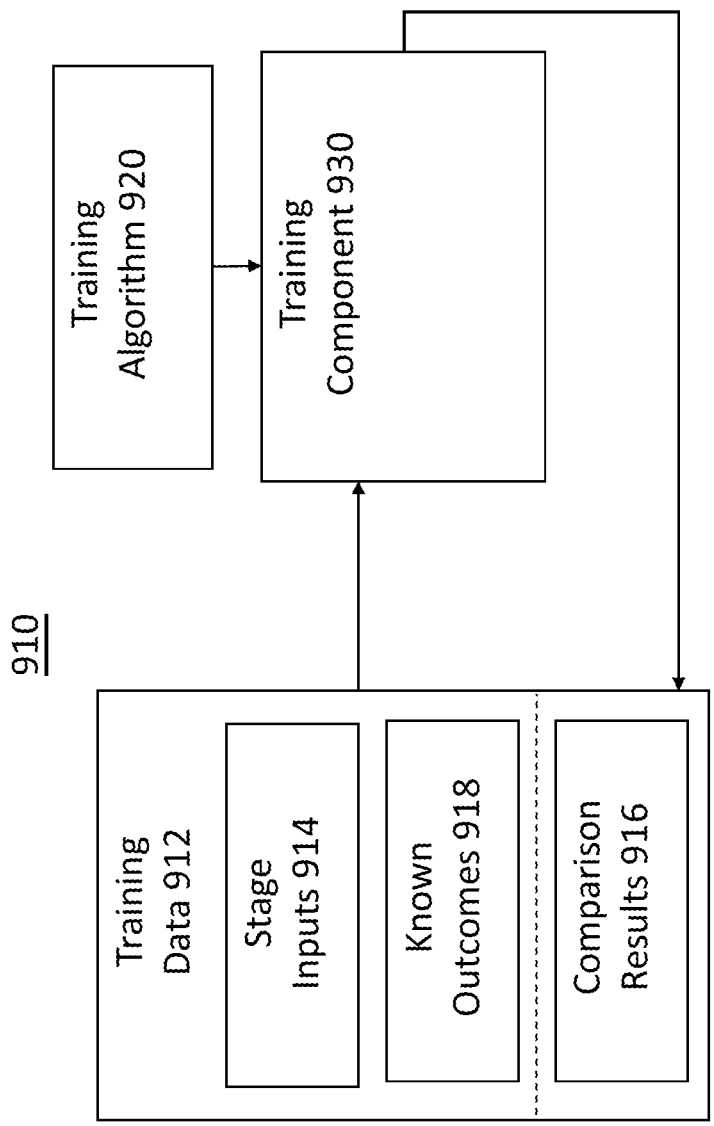
FIG. 9 shows an example machine learning training flow chart.

One or more implementations disclosed herein include and/or may be implemented using a machine learning model. For example, one or more of the tag proximity algorithm, papercraft digitization algorithm, fold render algorithm, instructions generation algorithm, fold monitoring algorithm, and/or fold advice algorithm, may be implemented using a machine learning model and/or may be used to train a machine learning model. A given machine learning model may be trained using the data flow 910 of FIG. 9. Training data 912 may include one or more of stage inputs 914 and known outcomes 918 related to a machine learning model to be trained. The stage inputs 914 may be from any applicable source including text, visual representations, data, values, comparisons, stage outputs (e.g., one or more outputs from a step from FIGS. 6, 7, and/or 8). The known outcomes 918 may be included for machine learning models generated based on supervised or semi-supervised training. An unsupervised machine learning model may not be trained using known outcomes 918. Known outcomes 918 may include known or desired outputs for future inputs similar to or in the same category as stage inputs 914 that do not have corresponding known outputs.

The training data 912 and a training algorithm 920 (e.g., tag proximity algorithm, papercraft digitization algorithm, fold render algorithm, instructions generation algorithm, fold monitoring algorithm, and/or fold advice algorithm may be implemented using a machine learning model and/or may be used to train a machine learning model) may be provided to a training component 930 that may apply the training data 912 to the training algorithm 920 to generate a machine learning model. According to an implementation, the training component 930 may be provided comparison results 916 that compare a previous output of the corresponding machine learning model to apply the previous result to re-train the machine learning model. The comparison results 916 may be used by the training component 930 to update the corresponding machine learning model. The training algorithm 920 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 6, 7, and/or 8, may be performed by one or more processors of a computer system as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

Figure 10:
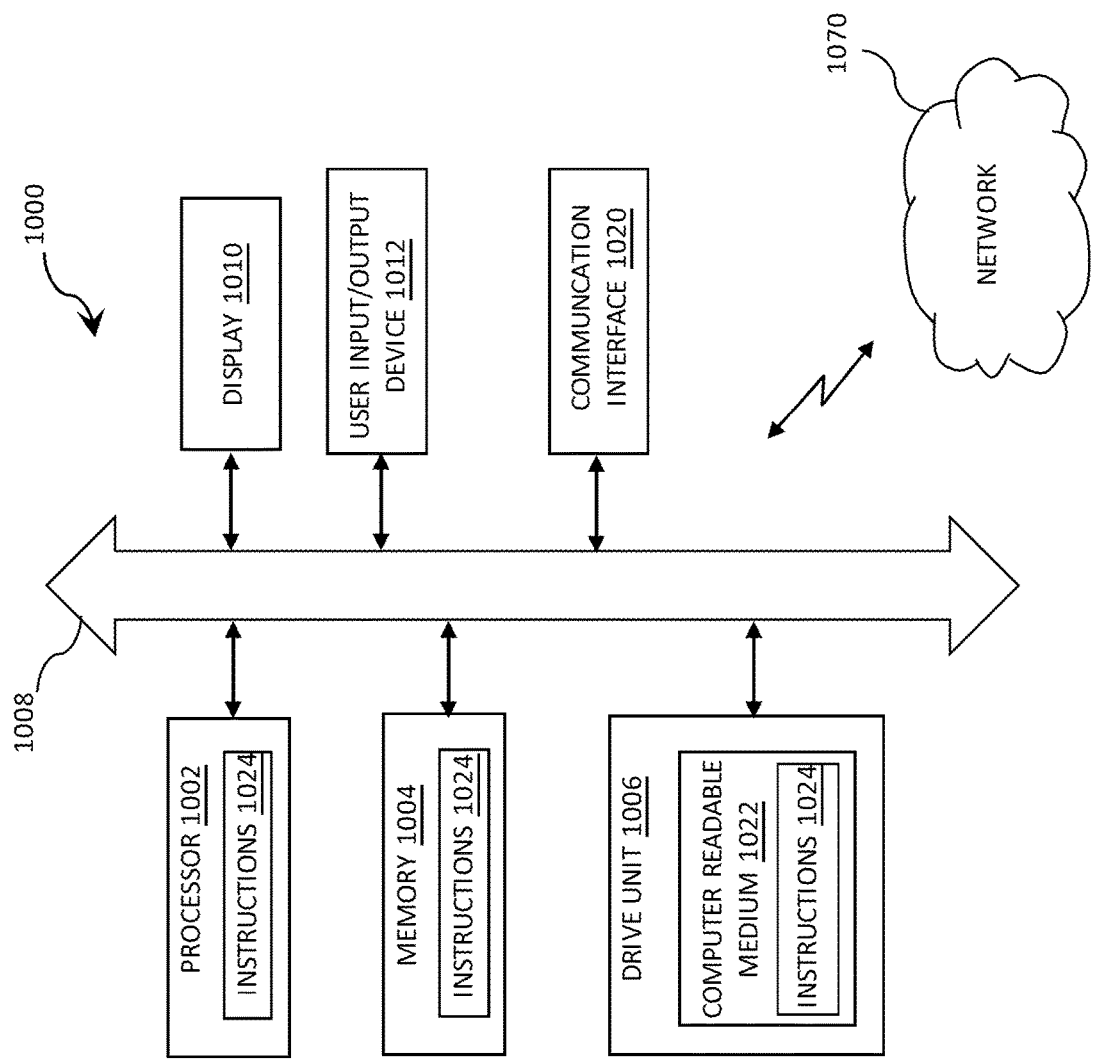
FIG. 10 illustrates an implementation of a general computer system that may execute techniques presented herein.

In various embodiments, one or more portions of methods 600, 700, and 800 may be implemented in, for instance, a chip set including a processor and a memory as shown in FIG. 10.

FIG. 10 illustrates an implementation of a general computer system that may execute techniques presented herein. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video, or data communication. Further, while a computer system 1000 is illustrated as a single system, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the processor 1002 executing the instructions stored in the memory 1004. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like. As shown, the computer system 1000 may further include a display 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input/output device 1012 configured to allow a user to interact with any of the components of computer system 1000. The input/output device 1012 may be a number pad, a keyboard, or a cursor control device, such as a mouse, or a joystick, touch screen display, remote control, or any other device operative to interact with the computer system 1000.

The computer system 1000 may also or alternatively include drive unit 1006 implemented as a disk or optical drive. The drive unit 1006 may include a computer-readable medium 1022 in which one or more sets of instructions 1024, e.g. software, can be embedded. Further, instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1070 can communicate voice, video, audio, images, or any other data over the network 1070.

Further, the instructions 1024 may be transmitted or received over the network 1070 via a communication port or interface 1020, and/or using a bus 1008. The communication port or interface 1020 may be a part of the processor 1002 or may be a separate component. The communication port or interface 1020 may be created in software or may be a physical connection in hardware. The communication port or interface 1020 may be configured to connect with a network 1070, external media, the display 1010, or any other components in computer system 1000, or combinations thereof. The connection with the network 1070 may be a physical connection, such as a wired Ethernet connection or may be established wirelessly as discussed below. Likewise, the additional connections with other components of the computer system 1000 may be physical connections or may be established wirelessly. The network 1070 may alternatively be directly connected to a bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to a network 1070. The network 1070 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1070 may include wide area networks (WAN), such as the Internet, local area networks (LAN), campus area networks, metropolitan area networks, a direct connection such as through a Universal Serial Bus (USB) port, or any other networks that may allow for data communication. The network 1070 may be configured to couple one computing device to another computing device to enable communication of data between the devices. The network 1070 may generally be enabled to employ any form of machine-readable media for communicating information from one device to another. The network 1070 may include communication methods by which information may travel between computing devices. The network 1070 may be divided into sub-networks. The sub-networks may allow access to all of the other components connected thereto or the sub-networks may restrict access between the components. The network 1070 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

It should be understood that the present invention can also (alternatively) be defined in accordance with the following configurations:

1. A computer-implemented method for digitization of papercraft folding for creation of a papercraft model comprising:
   monitoring, via an RFID reader, a sheet provided with an array of RFID tags,
   determining, based on RFID reader output, the occurrence of a fold performed on the sheet,
   determining fold properties of the occurred fold, and
   storing the fold properties as a fold dataset of the occurred fold.
2. The computer-implemented method of configuration 1 further comprising:
   generating a fold list by aggregating the respective fold datasets of occurred folds.
3. The computer-implemented method of any one of configurations 1 or 2 further comprising:
   initializing a papercraft digitization system by activating the RFID reader.
4. The computer-implemented method of any one of configurations 1 to 3, wherein the monitoring comprises:
   sending an emitter signal from the RFID reader,
   receiving a return signal from each RFID tag, and
   outputting the received return signals as RFID reader output.
5. The computer-implemented method of configuration 4, wherein determining the occurrence of a fold performed on the sheet comprises applying a tag proximity algorithm configured to:
   obtain the RFID reader output,
   analyze the received return signals to evaluate a proximity between RFID tags,
   generate a proximity link between two RFID tags when proximity between these two RFID tags is determined, wherein the proximity link includes tag IDs of the two RFID tags proximity was determined for, and assess the occurrence of a fold by outputting the proximity links.
6. The computer-implemented method of configuration 5, wherein analyzing the return signals comprises:
  determining return signal properties of each received return signal,
  comparing return signal properties of a received return signal of each RFID tag with return signal properties of a received return signal of every other RFID tag,
  determining a proximity between two RFID tags if their return signal properties correlate within a predefined threshold.
7. The computer-implemented method of configuration 6, wherein determining return signal properties comprises determining a relative change of return signal strength of a received return signal.
8. The computer-implemented method of any one of configurations 6 or 7, wherein comparing return signal properties comprises comparing a relative change, specifically a decrease, of return signal strength of received return signals.
9. The computer-implemented method of any one of configurations 7 or 8, wherein the change of return signal strength of a received return signal is determined by a comparison with return signal strength of a previously received return signal of the same RFID tag.
10. The computer-implemented method of any one of configurations 6 to 9, wherein a proximity between two RFID tags is determined:
  if their return signals exhibit correlating decreases in return signal strength, and
  specifically, if the decreases in return signal strength exceed a predetermined threshold of decrease, wherein the threshold of decrease is at least substantially 15%, specifically at least substantially 25%, particularly at least substantially 50%, and more particularly at least substantially 80%.
11. The computer-implemented method of any one of configurations 5 to 10, wherein the proximity link includes a proximity value which represents a fractional percentage decrease of the return signal strengths of the respective RFID tags proximity was determined for.
12. The computer-implemented method of any one of configurations 6 to 11, wherein determining return signal properties comprises calculating a phase shift between a received return signal and the emitted signal.
13. The computer-implemented method of any one of configurations 6 to 12, wherein comparing return signal properties comprises comparing phase shifts of the received return signals.
14. The computer-implemented method of any one of configurations 12 or 13, wherein a proximity between two RFID tags is determined if their respective phase shifts are substantially equal, particularly only if their respective phase shifts are substantially equal within a relative tolerance interval of −15% to +15%, more particularly within −10% to +10%, specifically within −5% to +5% and most particularly within −2.5% to +2.5%.
15. The computer-implemented method of any one of configurations 12 to 14, wherein the proximity link includes a proximity value which is calculated from a deviation of phase shifts of the RFID tags proximity was determined for.
16. The computer-implemented method of any one of configurations 5 to 15, wherein the generation of a proximity link is triggered upon determining proximity between two RFID tags.
17. The computer-implemented method of any one of configurations 5 to 16, wherein outputting a proximity link comprises storing it on a tag database and relating it to the tag IDs of the RFID tags proximity was determined for.
18. The computer-implemented method of any one of configurations 5 to 17, wherein the tag proximity algorithm is further configured to:
  initiate a papercraft digitization algorithm upon recognition of a new proximity link.
19. The computer-implemented method of any one of configurations 5 to 18, wherein determining the fold properties of an occurred fold comprises applying a papercraft digitization algorithm configured to:
  calculate fold properties of each fold based on tag data of the RFID tags.
20. The computer-implemented method of configuration 19, wherein the tag data includes for each RFID tag one or more of the following, particularly all of the following:
  a tag ID,
  predefined tag coordinates with respect to the sheet,
  a tag resonance frequency,
  a proximity link, if present, and particularly, the tag data being stored on a tag database.
21. The computer-implemented method of any one of configurations 19 or 20, wherein calculating the fold properties comprises:
  retrieving tag data from the tag database, and
  determining:
    a mid-point of the occurred fold by averaging x-coordinates and y-coordinates of the RFID tags being correlated by a proximity link,
    x- and y-coordinates of a fold line through which the occurred fold is estimated to run through based on the mid-point and/or the x-coordinates and y-coordinates of the RFID tags,
    a folding angle of the occurred fold with respect to a datum, such as a specific edge of the sheet having a length L, using trigonometry and the x- and y-coordinates of the previously calculated fold line,
    particularly, if proximity values are present, a closing angle of the occurred fold is determined based on a change rate of proximity values of RFID tags distanced further away from the fold line in a normal direction.
22. The computer-implemented method of configuration 21, wherein the closing angle is determined by assessing a series of proximity values of RFID tags arranged along a normal direction with respect to the fold line and in an increasing distance from the fold line, and then applying a conversion factor to the series of proximity values to obtain the closing angle.
23. The computer-implemented method of any one of configurations 4 to 22 being executed in real-time during the creation process of folding, wherein the emitter signal is repeatedly sent at specific time intervals, wherein the time interval between two emitter signals is selected to secure that a maximum of one fold is performed during the time interval.
24. The computer-implemented method of configuration 23, wherein the time interval is determined by a sampling rate, and specifically, the sampling rate having a frequency of at least 0.1 Hz, more specifically at least 1 Hz, particularly at least 5 Hz and more particularly at least 10 Hz.
25. The computer-implemented method of any one of configurations 23 or 24, wherein a set of return signals is repeatedly received at each time interval, the set of return signals containing a return signal received from each of the RFID tags, and the repeatedly received sets of return signals resulting in a time series of sets of return signals.

26. The computer-implemented method of configuration 25 if dependent on configuration 5, wherein each set of return signals of the time series is analyzed, and specifically, wherein each set of return signals of the time series is analyzed by comparing a newly received set of return signals with a set of return signals received at a previous, specifically immediately previous, time interval.

27. The computer-implemented method of any one of configurations 23 to 26, if dependent on configuration 5, wherein a set of proximity links is generated at each time interval, if proximity is determined.

28. The computer-implemented method of configuration 27, wherein fold properties are determined for each set of proximity links.

29. The computer-implemented method of any one of configurations 27 or 28, wherein for each set of proximity links the fold properties are added as a new fold dataset in the fold list.

30. The computer-implemented method of any one of the preceding configurations, wherein:
the sheet is repeatedly monitored at regular time intervals,
a time series of sets of return signals is received from the RFID tags and analyzed,
return signals are compared within the set of return signals received at the same time interval and/or with one or more sets of return signals over previous time intervals,
based on the comparison, fold properties of occurred folds are calculated which must have taken place in order to receive the present set of return signals.

31. The computer-implemented method of any one of configurations 4 to 30 being executed after the creation process of folding is completed, wherein the emitter signal is sent at least once to receive at least one set of return signals.

32. The computer-implemented method of configuration 31 if dependent on configuration 5, wherein determining the fold properties of an occurred fold comprises applying a papercraft digitization algorithm configured to:
reverse-generating a fold list including the fold datasets of folds which must have occurred based on the present set of proximity links determined from the at least one set of return signals.

33. The computer-implemented method of configuration 32, wherein reverse-generating includes:
virtually unfolding the sheet to reach a state of zero proximity links,
generating possible lists of unfolds resulting in a completely unfolded sheet,
ranking the generated lists of unfolds,
selecting one list of unfolds based on given parameters, such as a number of fewest unfolds, and
reversing the selected list of unfolds to obtain a fold list.

34. The computer-implemented method of any one of configurations 2 to 33 further comprising:
applying the fold list to a virtual representation of the sheet, and
displaying the virtual representation via a user-interface.

35. The computer-implemented method of configuration 34, wherein applying the fold list to a virtual representation of the sheet includes applying a fold render algorithm configured to:
create a three-dimensional mesh model of the sheet in an unfolded state,
apply the fold datasets from the fold list, specifically one at a time, and
recalculate the mesh model with each application of a fold dataset.

36. The computer-implemented method of configuration 35, wherein the fold render algorithm is further configured to store the mesh model at different stages of the application of fold datasets as a virtual representation of the sheet representing the sheet in a folded state.

37. The computer-implemented method of any one of configurations 35 or 36, wherein the fold render algorithm is further configured to store the mesh model after the application of all fold datasets as a virtual representation of the sheet representing the sheet in a completely folded state.

38. The computer-implemented method of any one of configurations 35 to 37, wherein the user-interface is configured to allow a user to view, move and/or edit the virtual representation.

39. The computer-implemented method of any one of configurations 2 to 38 further comprising:
generating a set of folding instructions in natural language using the fold list.

40. The computer-implemented method of configuration 39 wherein generating a set of folding instructions includes applying an instructions generation algorithm configured to:
select and obtain for each fold dataset of the fold list an instruction template from a set of predefined instruction template based on the fold properties of the fold dataset,
populate each obtained instruction template with the fold properties contained in the respective fold dataset,
assign a number to each obtained instruction template based on the position of the respective fold dataset in the fold list,
collate the obtained instruction templates into a single document when each instruction template has been populated and numbered, and
output the document as folding instructions.

41. The computer-implemented method of configuration 1 further comprising:
generating an updating fold list by aggregating the respective fold datasets of occurred folds performed by a user according to folding instructions of a papercraft model selected by the user,
assessing the adherence of the updating fold list to an existing fold list which corresponds to the selected folding instructions, and
generating a user output if fold discrepancies between the updating fold list and the existing fold list are determined.

42. The computer-implemented method of configuration 41, wherein assessing the adherence of the updating fold list to an existing fold list includes applying a fold monitoring algorithm configured to:
real-time monitor each newly occurred fold by comparing each fold dataset newly aggregated to the updating fold list with the corresponding fold dataset of the existing fold list,
output a fold discrepancy for each fold property of the compared datasets which are not conforming.

43. The computer-implemented method of any one of configurations 41 or 42, wherein generating a user output includes applying a fold advice algorithm configured to:

retrieve the fold discrepancies of the newly occurred fold, and generate a prompt or advice outputted to the user via a user-interface.

44. The computer-implemented method of configuration 43, wherein the prompt or advice comprises visual or audio information notifying the user of a fold discrepancy, specifically comprising a notification informing the user of changes the user needs to make in order to adhere to the selected folding instructions.

45. The computer-implemented method of any one of configurations 43 or 44, wherein the user-interface may be a smartphone, a display and/or a sound emitting device.

46. The computer-implemented method of any one of configurations 41 to 45, wherein the selected folding instructions are generated according to the method of any one of configurations 39 or 40.

47. The computer-implemented method of any one of configurations 41 to 46, wherein the updating fold list is generated according to the method of any one of configurations 1 to 30.

48. The computer-implemented method of any one of configurations 41 to 47, wherein the existing fold list is generated according to the method of any one of configurations 1 to 33.

49. The computer-implemented method of any one of configurations 41 to 48 being executed during a user is performing papercraft folding.

50. A papercraft digitization system comprising:
a sheet provided with an array of RFID tags,
an RFID reader configured to monitor the RFID tags,
a processing module configured to determine the occurrence and fold properties of a fold based on RFID reader output provided by the RFID reader, wherein the processing module is further configured to generate a fold list by storing the fold properties of each occurred fold as a fold dataset.

51. The papercraft digitization system of configuration 50 being configured to perform the method of any one of configurations 1 to 49.

52. The papercraft digitization system of any one of configurations 50 or 51, wherein each RFID tag comprises a transponder circuit and an integrated circuit such as a microchip.

53. The papercraft digitization system of any one of configurations 50 to 52, wherein the array of RFID tags comprises passive RFID tags.

54. The papercraft digitization system of any one of configurations 50 to 53, wherein the RFID tags are distributed on the sheet at specific individual tag coordinates.

55. The papercraft digitization system of configuration 54, wherein the tag coordinates are stored on a tag database of the processing module, and wherein the tag coordinates are linked with a tag ID of the respective RFID tag.

56. The papercraft digitization system of any one of configurations 50 to 55, wherein the RFID tags are arranged in a predefined pattern on the sheet.

57. The papercraft digitization system of any one of configurations 50 to 56, wherein predefined fold lines which are to be performed are applied to, particularly printed onto, the sheet according to an existing fold list.

58. The papercraft digitization system of any one of configurations 50 to 57, wherein the RFID tags are arranged on the sheet in a pattern corresponding to predefined fold lines which are to be performed, and specifically wherein at least a subset of RFID tags is arranged laterally on both sides of the respective predefined fold line.

59. The papercraft digitization system of configuration 58, wherein the RFID tags which correspond to a specific predefined fold line have the same resonance frequencies, and specifically,
wherein the RFID tags which correspond to a specific predefined fold line have resonance frequencies differing from the resonance frequencies of RFID tags of a subset which corresponds to another predefined fold line.

60. The papercraft digitization system of any one of configurations 50 to 58, wherein the array of RFID tags comprises at least two, specifically at least 9, most specifically at least 81 RFID tags.

61. The papercraft digitization system of any one of configurations 50 to 60, wherein the RFID tags are applied on a surface of the sheet and/or wherein the RFID tags are applied into the sheet.

62. The papercraft digitization system of any one of configurations 50 to 61, wherein the RFID tags are printed onto or in the sheet, such as by screen printing or by ink jet printing.

63. The papercraft digitization system of any one of configurations 50 to 62, wherein the sheet is made of a foldable material such as paper material or plastic material.

64. The papercraft digitization system of any one of configurations 50 to 63, wherein the RFID reader is configured to send an emitter signal at one or more emission frequencies and to receive a return signal at an individual tag resonance frequency from each RFID tag.

65. The papercraft digitization system of any one of configurations 50 to 64, wherein the RFID reader is configured to control the emission frequency to preferentially probe the tag resonance frequency of particular RFID tags.

66. The papercraft digitization system of any one of configurations 50 to 65, wherein the RFID reader is located in a non-portable or portable device, such as a smartphone, internet router.

67. The papercraft digitization system of any one of configurations 50 to 66, wherein the processing module comprises one or more of:
a tag database for storing tag data including:
tag IDs,
tag coordinates with respect to the sheet,
tag resonance frequencies,
proximity links,
a fold database for storing one or more fold lists and/or one or more folding instructions,
one or more processors for applying at least the algorithms of the method of any one of configurations 1 to 49.

68. A fold database containing fold lists generated according to the method of any one configurations 1 to 33.

69. A computer-implemented method for generating a set of folding instructions for creation of a papercraft model comprising:
obtaining a fold list from a fold database, specifically from the fold database of configuration 68.
generating a set of folding instructions in natural language using the obtained fold list.

70. The computer-implemented method of configuration 69 wherein generating a set of folding instructions includes applying an instructions generation algorithm configured to:

select and obtain for each fold dataset of the fold list an instruction template from a set of predefined instruction templates based on fold properties of the fold dataset, populate each obtained instruction template with the fold properties contained in the respective fold dataset, assign a number to each obtained instruction template based on the position of the respective fold dataset in the fold list, collate the obtained instruction templates into a single document when each instruction template has been populated and numbered, and output the document as folding instructions.

The invention claimed is:

1. A computer-implemented method for digitization of papercraft folding for creation of a papercraft model comprising:
monitoring, via an RFID reader, a sheet provided with an array of RFID tags;
determining, based on RFID reader output, an occurrence of a fold performed on the sheet;
determining fold properties of the occurred fold; and
storing the fold properties as a fold dataset of the occurred fold.

2. The computer-implemented method of claim 1, further comprising:
generating a fold list by aggregating the respective fold datasets of occurred folds.

3. The computer-implemented method of claim 2, further comprising:
applying the fold list to a virtual representation of the sheet; and
displaying the virtual representation via a user-interface.

4. The computer-implemented method of claim 2, further comprising:
generating a set of folding instructions in natural language using the fold list, and specifically, wherein generating a set of folding instructions includes applying an instructions generation algorithm configured for:
selecting and obtaining for each fold dataset of the fold list an instruction template from a set of predefined instruction template based on the fold properties of the fold dataset;
populating each obtained instruction template with the fold properties contained in the respective fold dataset;
assigning a number to each obtained instruction template based on a position of the respective fold dataset in the fold list;
collating the obtained instruction templates into a single document when each instruction template has been populated and numbered; and
outputting the document as folding instructions.

5. The computer-implemented method of claim 1, wherein the monitoring comprises:
sending an emitter signal from the RFID reader;
receiving a return signal from each RFID tag; and
outputting the received return signals as RFID reader output.

6. The computer-implemented method of claim 5, wherein determining the occurrence of the fold performed on the sheet comprises applying a tag proximity algorithm configured to:
obtaining the RFID reader output;
analyzing the received return signals to evaluate a proximity between RFID tags;
generating a proximity link between two RFID tags when proximity between these two RFID tags is determined, wherein the proximity link includes tag IDs of the two RFID tags proximity was determined for; and
assessing the occurrence of the fold by outputting the proximity links.

7. The computer-implemented method of claim 6, wherein analyzing the received return signals comprises:
determining return signal properties of each received return signal;
comparing the return signal properties of a received return signal of each RFID tag with the return signal properties of the received return signal of every other RFID tag; and
determining the proximity between the two RFID tags if their return signal properties correlate within a predefined threshold.

8. The computer-implemented method of claim 7, wherein determining the return signal properties comprises determining a relative change of return signal strength of the received return signal, and specifically, and wherein the proximity between the two RFID tags is determined when their return signals exhibit correlating decreases in the return signal strength.

9. The computer-implemented method of claim 7, wherein determining the return signal properties comprises calculating a phase shift between the received return signal and an emitted signal, and specifically, and wherein the proximity between the two RFID tags is determined if their respective phase shifts are substantially equal.

10. The computer-implemented method of claim 6, wherein determining the fold properties of the occurred fold comprises applying a papercraft digitization algorithm configured for:
calculating the fold properties of each fold based on tag data of the RFID tags.

11. The computer-implemented method of claim 10, wherein calculating the fold properties comprises:
retrieving tag data from a tag database;
determining a mid-point of the occurred fold by averaging x-coordinates and y-coordinates of the RFID tags being correlated by the proximity link;
determining the x-coordinates and the y-coordinates of a fold line through which the occurred fold is estimated to run through based on the mid-point and/or the x-coordinates and the y-coordinates of the RFID tags; and
determining a folding angle of the occurred fold with respect to a datum, such as a specific edge of the sheet having a length L, using trigonometry and the x-coordinates and the y-coordinates of a previously calculated fold line.

12. The computer-implemented method of claim 5, being executed in real-time during a creation process of folding, wherein the emitter signal is repeatedly sent at specific time intervals, wherein the time interval between two emitter signals is selected to secure that a maximum of one fold is performed during the time interval.

13. The computer-implemented method of claim 12, being executed after the creation process of folding is completed, wherein the emitter signal is sent at least once to receive at least one set of return signals.

14. The computer-implemented method of claim 1, further comprising:
generating an updating fold list by aggregating the respective fold datasets of occurred folds performed by a user according to folding instructions of the papercraft model selected by the user;

assessing an adherence of the updating fold list to an existing fold list which corresponds to the selected folding instructions; and generating a user output if fold discrepancies between the updating fold list and the existing fold list are determined.

15. A papercraft digitization system comprising:

a sheet provided with an array of RFID tags;

an RFID reader configured to monitor the RFID tags;

a processing module configured to determine an occurrence and fold properties of a fold based on RFID reader output provided by the RFID reader, wherein the processing module is further configured to generate a fold list by storing the fold properties of each occurred fold as a fold dataset.

16. The papercraft digitization system of claim 15, wherein each RFID tag comprises a transponder circuit and an integrated circuit such as a microchip.

17. The papercraft digitization system of claim 15, wherein the array of RFID tags comprises passive RFID tags.

18. The papercraft digitization system of claim 15, wherein the RFID tags are distributed on the sheet at specific individual tag coordinates.

19. The papercraft digitization system of claim 18, wherein the tag coordinates are stored on a tag database of the processing module, and wherein the tag coordinates are linked with a tag ID of the respective RFID tag.

20. A system for digitization of papercraft folding for creation of a papercraft model comprising:

monitoring, via an RFID reader, a sheet provided with an array of RFID tags;

determining, based on RFID reader output, an occurrence of a fold performed on the sheet;

determining fold properties of the occurred fold; and storing the fold properties as a fold dataset of the occurred fold.

* * * * *